(12) United States Patent
Nelson

(10) Patent No.: US 10,649,612 B2
(45) Date of Patent: May 12, 2020

(54) TEXTUAL CONTENT SPEED PLAYER

(71) Applicant: Andrew Thomas Nelson, Pembroke, MA (US)

(72) Inventor: Andrew Thomas Nelson, Pembroke, MA (US)

(*) Notice: Subject to any disclaimer, the term of this patent is extended or adjusted under 35 U.S.C. 154(b) by 0 days.

(21) Appl. No.: 15/797,771

(22) Filed: Oct. 30, 2017

(65) Prior Publication Data
US 2018/0067902 A1 Mar. 8, 2018

Related U.S. Application Data

(63) Continuation of application No. 15/693,278, filed on Aug. 31, 2017.

(60) Provisional application No. 62/381,625, filed on Aug. 31, 2016.

(51) Int. Cl.
| | |
|---|---|
| *G06F 3/0481* | (2013.01) |
| *G09B 5/02* | (2006.01) |
| *G06F 40/103* | (2020.01) |
| *G06F 40/109* | (2020.01) |
| *G06F 3/0483* | (2013.01) |
| *G06T 11/60* | (2006.01) |
| *G06T 13/80* | (2011.01) |
| *G10L 13/04* | (2013.01) |
| *G09B 17/00* | (2006.01) |
| *G09B 17/04* | (2006.01) |

(52) U.S. Cl.
CPC ........ *G06F 3/04812* (2013.01); *G06F 3/0483* (2013.01); *G06F 40/103* (2020.01); *G06F 40/109* (2020.01); *G06T 11/60* (2013.01); *G06T 13/80* (2013.01); *G09B 5/02* (2013.01); *G10L 13/043* (2013.01); *G09B 17/006* (2013.01); *G09B 17/04* (2013.01)

(58) Field of Classification Search
CPC ... G06F 17/211; G06F 3/0483; G09B 17/006; G09B 17/04
See application file for complete search history.

(56) References Cited

U.S. PATENT DOCUMENTS

| | | | |
|---|---|---|---|
| 9,619,462 B2 * | 4/2017 | Yi | G06F 17/2827 |
| 2009/0191522 A1 * | 7/2009 | McClain | G09B 1/00 434/170 |

(Continued)

*Primary Examiner* — Howard Cortes

(57) ABSTRACT

A computer program that plays a user's textual content in an animated format to increase reading speed via reconditioning reading behavior. The computer program: highlights a word being read and positions a copy in the center of the page so a reader can eliminate repositioning their eyes and still satisfy the common scanning strategy's need to have a word projected on the center of the retina while the reader is reconditioned by the highlighting progressing through the text to use the faster scanning strategy of changing the position on the retina being read with eyes fixed; presents a picture representing the word's meaning to recondition users to utilize the faster cognitive strategy of triggering recognition of meaning with a picture; highlights the word for a time calculated using syllables to create a presentation in sync with the natural timing of speech; can play/record a voice speaking the word for creating audible textual presentations enabling the non-reader to enjoy their textual content while learning printed language through context alone.

30 Claims, 18 Drawing Sheets

(56) References Cited

U.S. PATENT DOCUMENTS

| | | | |
|---|---|---|---|
| 2011/0106970 A1* | 5/2011 | Song | H04L 65/4015 709/236 |
| 2012/0240085 A1* | 9/2012 | Sim | G09B 5/14 715/864 |
| 2013/0100139 A1* | 4/2013 | Schliesser | G09B 5/02 345/467 |
| 2013/0275120 A1* | 10/2013 | DeGross | G06F 17/28 704/9 |
| 2014/0164366 A1* | 6/2014 | Narayanan | G06F 17/30014 707/723 |
| 2014/0331125 A1* | 11/2014 | Tigchelaar | G06F 17/211 715/249 |
| 2015/0186351 A1* | 7/2015 | Hicks | G06F 17/241 715/232 |
| 2015/0205884 A1* | 7/2015 | Leventhal | G06F 17/2247 715/234 |
| 2016/0117301 A1* | 4/2016 | Chan | G06F 17/241 715/753 |
| 2017/0109916 A1* | 4/2017 | Kurz | G06T 19/006 |

* cited by examiner

TEXTUAL CONTENT SPEED PLAYER

CROSS-REFERENCE TO RELATED APPLICATIONS

This application is a non-provisional of and claims priority to U.S. Patent Application No. 62/381,625, titled "Textual Content Speed Player," and filed on Aug. 31, 2016, the disclosure of which is incorporated by reference herein in its entirety.

BACKGROUND OF THE INVENTION

The ability to read fast with a high level of comprehension is a vital skill in an information age. Most readers can read less than 300 words per minute while the fastest readers can read more than 3000 words per minute.

The reading strategy that most readers use is a combination of a scanning strategy and a cognitive strategy. The scanning strategy involves repositioning the eyes to project a word that is being read presently on the center of the retina. The cognitive strategy involves imagining the sound of a word expressed in text on a page in order to trigger recognition of meaning, commonly called subvocalization. Herein, this combined reading strategy is referred to as "Traditional reading strategy." The act of using this strategy is referred to as "Traditional reading behavior" and to those who engage in using this strategy as "Traditional readers."

The reading strategy that the fastest readers use is also a combination of a scanning strategy and a cognitive strategy. The scanning strategy involves fixing the eyes on a point on a page and changing the position on the retina that is being read. The cognitive strategy involves imagining a picture representing a word expressed in text on the page in order to trigger recognition of meaning. Herein, this combined reading strategy is referred to as "Speed reading strategy." Herein, the act of using this strategy is referred to as "Speed reading behavior" and to those who engage in using this strategy as "Speed readers."

Traditional readers have known for many years the strategies Speed readers employ but still only few readers enjoy the benefits of reading 3,000 words per minute with a high level of comprehension.

The problem is not understanding Speed reading strategy but instead how to recondition Traditional reading behavior which has been ingrained by years of experience. The amount of time and level of immersion required to recondition most Traditional readers is far beyond a Speed reading course with practice sessions and exercises. Instead, a reconditioning strategy must be created to enable a Traditional reader to read their choice of textual content while creating a behavioral bridge to new found Speed reading behavior.

SUMMARY OF THE INVENTION

The solution is a computer implemented system and method which presents a body of text on a computerized display in an animated format. The system requires nothing more of a Traditional reader than reading their choice of book, magazine or newspaper in the animated format in order to recondition the Traditional reader to engage in Speed reading behavior.

Most readers are accustomed to repositioning their eyes and engaging in the cognitive strategy of imagining the sound of words in groups of 30 characters, so the system, as a default, highlights a word or word group in a body of text 30 characters long or less. In the system's animated format, the highlighted word or word group indicates the textual content in the body of text the reader is reading presently. Simultaneous to highlighting the word or word group being read presently, the system displays a copy or "additional expression" of the now highlighted word or word group in an additional position, ideally, located in the center of the body of text. Simultaneous to highlighting the word or word group being read presently and displaying the additional expression in the center of the body of text the system displays a picture or "pictorial representation" representing the meaning of the word or word group being read presently.

The Traditional reader uses the system's animated format by fixing the eyes on the additional expression of the word or word group being read presently located in the center of the body of text. The additional expression enables the Traditional reader to fix the eyes, as Speed readers do, and still functionally read by satisfying the need of the Traditional reader's scanning strategy to have a word being read presently projected on the center of the retina.

The human eye is conditioned to notice motion, so with the Traditional reader's eyes now fixed on the additional expressions located in the center of the body of text, the highlighting of words and/or word groups progressing through the body of text draws attention and in time reconditions the Traditional reader to move the position on the retina that is being read, as in the Speed reader's scanning strategy.

The combination of highlighting a word or word group in the body of text and displaying an additional expression in the center of the body of text constitutes a reconditioning strategy, referred to herein as "Additional Expression strategy," which creates a behavioral bridge between the scanning strategies of Traditional readers and Speed readers.

If a user was shown a picture of a helicopter, the user would recognize the subject was a helicopter much quicker than compared to the time it takes to say "Helicopter." An imagined picture to trigger recognition of meaning is the cognitive strategy Speed readers use to attain phenomenal reading speeds while actually increasing comprehension. After repeated exposure, the system's simultaneous displaying of the pictorial representation of the word or word group being read presently literally outruns a Traditional reader's cognitive strategy of subvocalization to triggering recognition of meaning. As a result, the Traditional reader is reconditioned away from subvocalization and toward the Speed reader's cognitive strategy of triggering recognition of meaning with a picture. This reconditioning strategy, referred to herein as "Picture Trigger strategy", creates a behavioral bridge between the cognitive strategies of Traditional readers and Speed readers.

Reading speed is generally expressed in units of words read per minute. The user sets a preferred reading speed in units of words per minute. The user can opt to also have the presentation of their textual content timed based on words per minute. In this case, the system highlights a word or word group being read presently for a length of time determined by the sum of the number of words in the word group, with a percentage of a word arbitrarily assigned to each space and form of punctuation included in the sum, multiplied by the set duration of time one word of textual content is to be displayed. Herein, this strategy for timing the highlighting of a word or word group will be referred to as "Word display speed mode." However, this is not the ideal embodiment. Alternatively, the system can use the set reading speed in words per minute to calculate the number of syllables per minute needed to create a presentation of textual content of equal duration and then highlight the word or word group being read presently for a length of time determined by the sum of the number of syllables in the word group, with a percentage of a syllable arbitrarily assigned to each space and form of punctuation included in the sum, multiplied by the calculated duration of time one syllable of textual content is to be displayed. Herein, this strategy for timing the highlighting of a word or word group will be referred to as "Syllable display speed mode." The presentation of textual content with timing based on syllables per minute flows naturally because the timing of the presentation is in sync with the natural timing of speech.

To accommodate people with no or limited knowledge of printed language a voice speaking a word or word group being read presently can be added to the system's format. The speaking voice or "vocal representation" completes the context necessary for a non-reader to enjoy printed content while being exposed to the knowledge needed to read printed language. This reconditioning strategy, referred to herein as "Complete Context strategy," can eliminate the need for instruction in reading printed language by teaching reading through context alone.

When using a device capable of audio recording, the user can read a body of text in the animated format out loud and the system will record the audio of the user speaking. An individual recording of each word spoken is created and associated with the word in a database so that the audio recording of the word spoken can be used to create a vocally enhanced textual presentation of not only the body of text the word was recorded in recitation of but also any body of text containing the word.

This summary is provided to introduce simplified concepts concerning a textual content speed reader, which is further described below in the Detailed Description. This summary is not intended to identify essential features of the claimed subject matter, nor is it intended for use in determining the scope of the claimed subject matter.

BRIEF DESCRIPTION OF FIGURES

Example embodiments of a textual content speed player are described with the reference to the following illustrations. The same numbers are used throughout the illustrations to reference like features and elements.

DETAILED DESCRIPTION

Overview

Figure 1A:
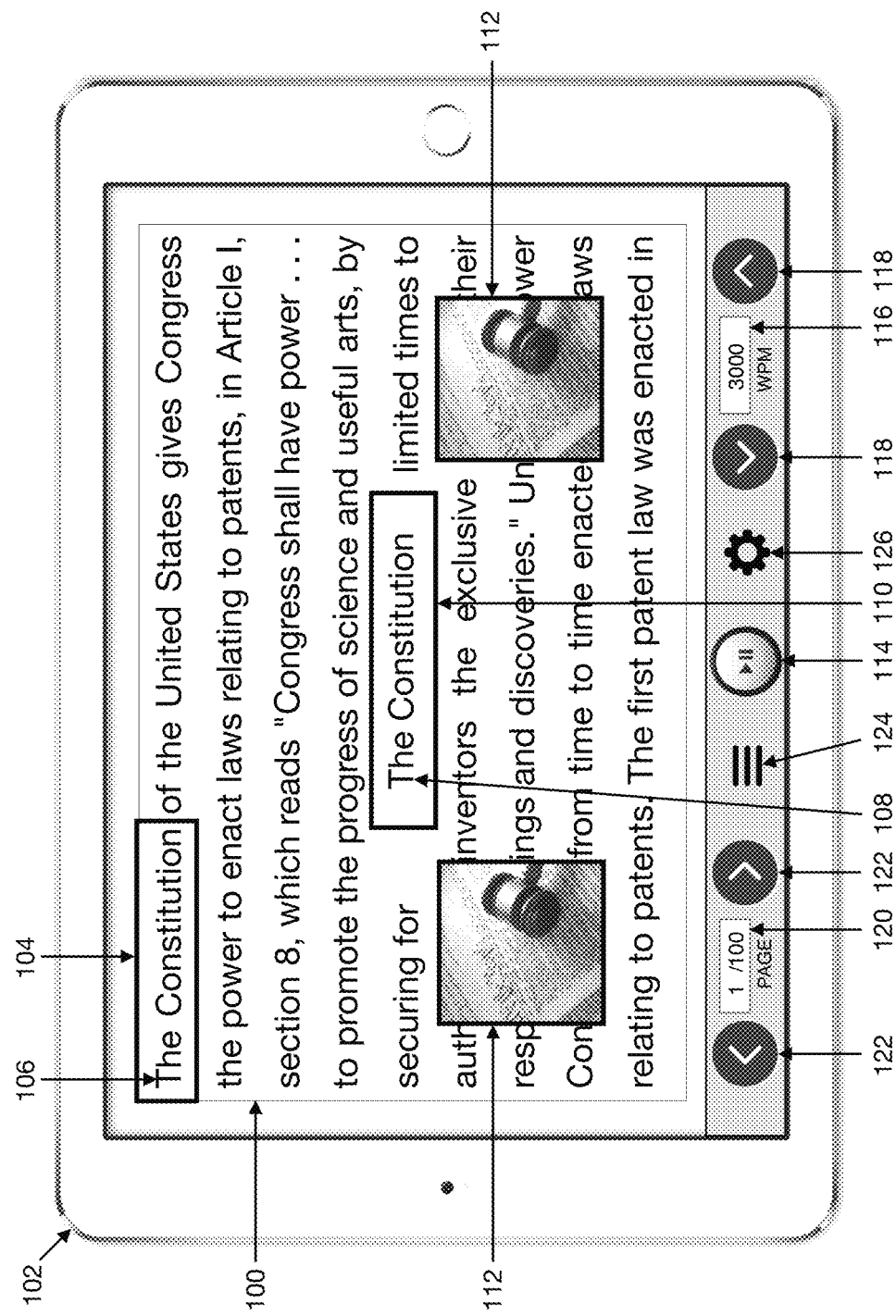
FIGS. 1A-1D constitutes a slide show of the animated format including: a body of text with a black font against a white background; highlighting via enclosing in a rectangle; an additional expression in a rectangle: and dual pictorial representations affixed to stationary positions.
Figure 1B:
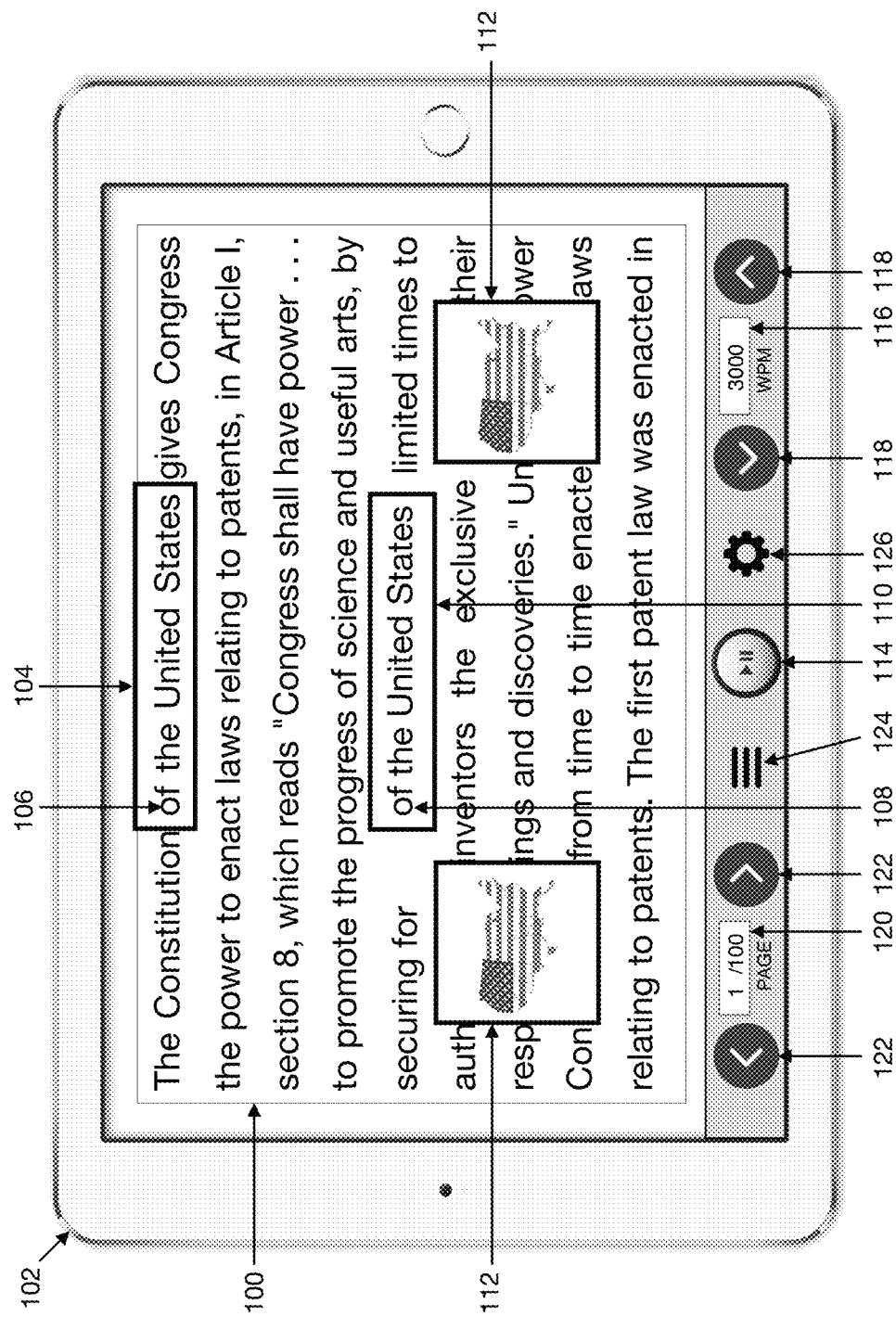
Figure 1C:
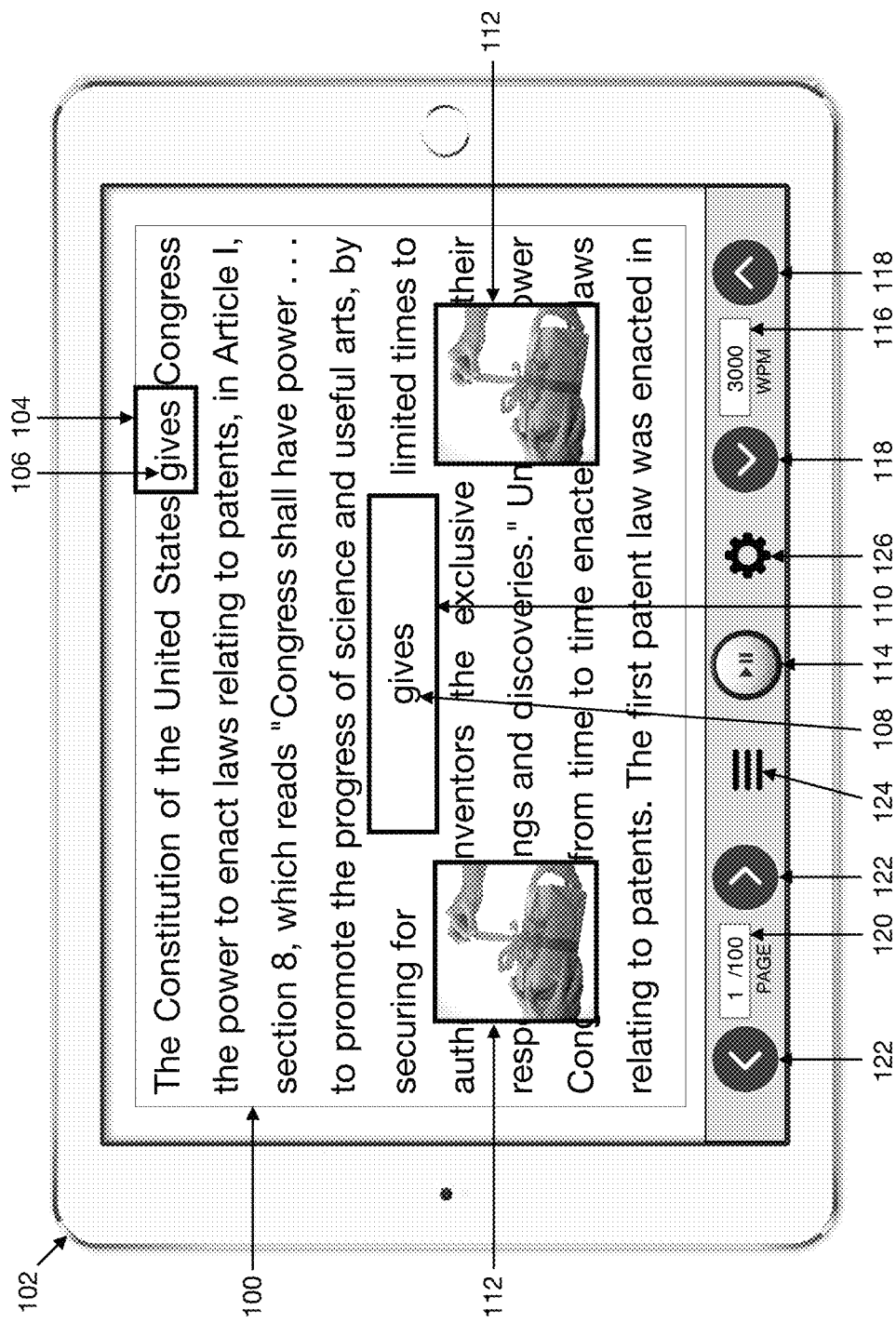
Figure 1D:
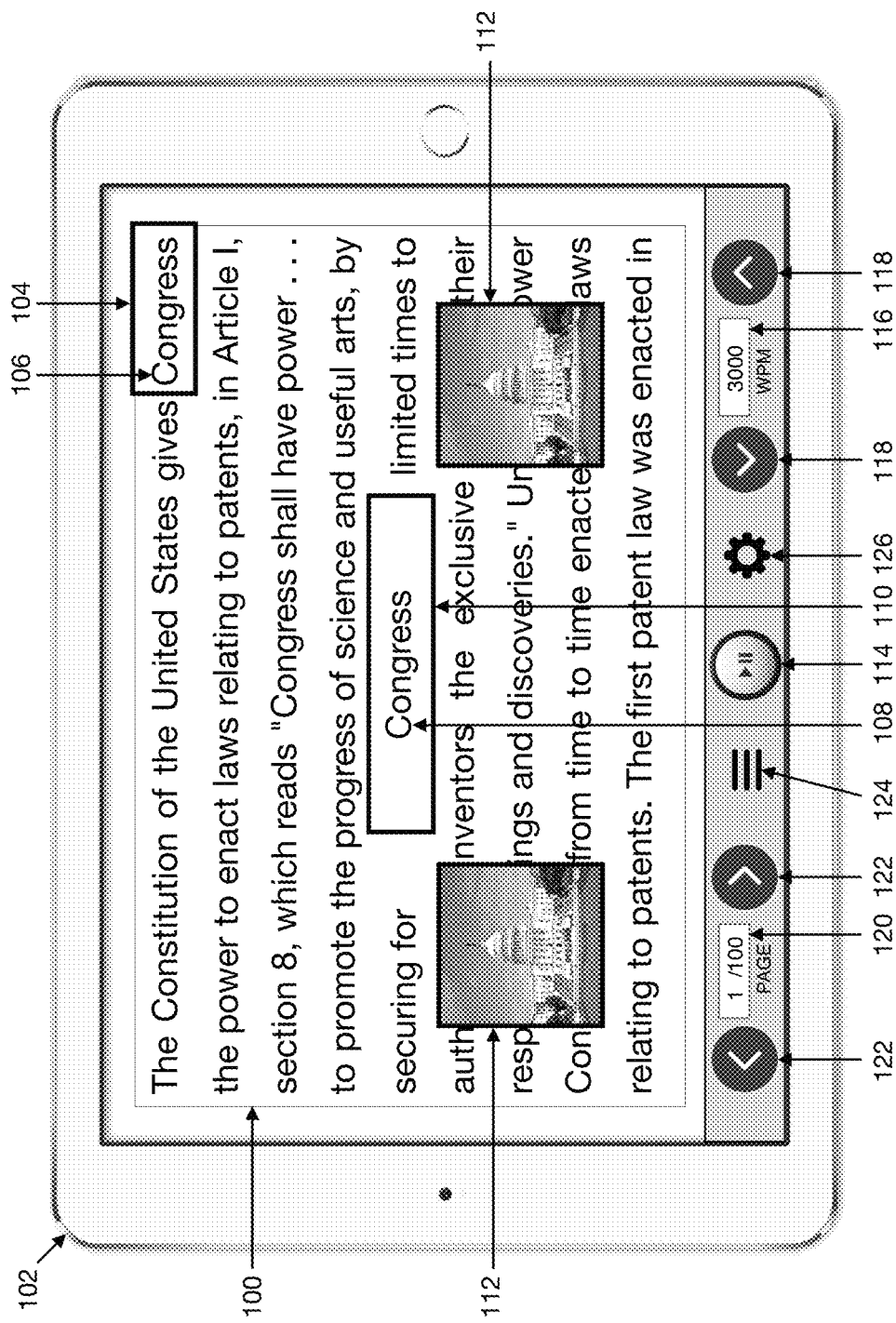
Figure 2A:
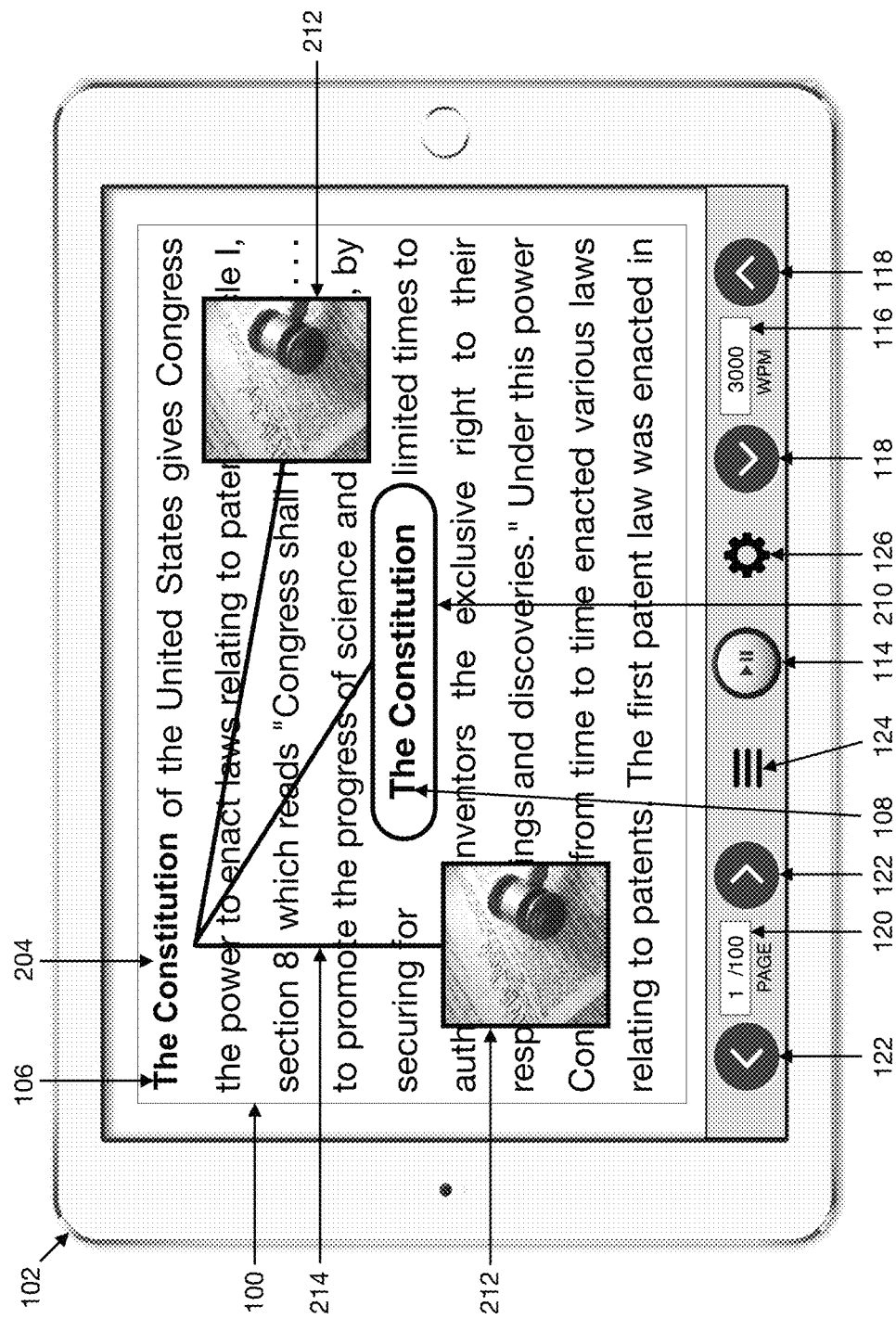
FIGS. 2A-2D constitutes a slide show of the animated format including: a body of text with a black font against a white background; highlighting via bold font and a pointer animation; an additional expression in a rounded rectangle with a bold font: and dual pictorial representations affixed to positions that relocate.
Figure 2B:
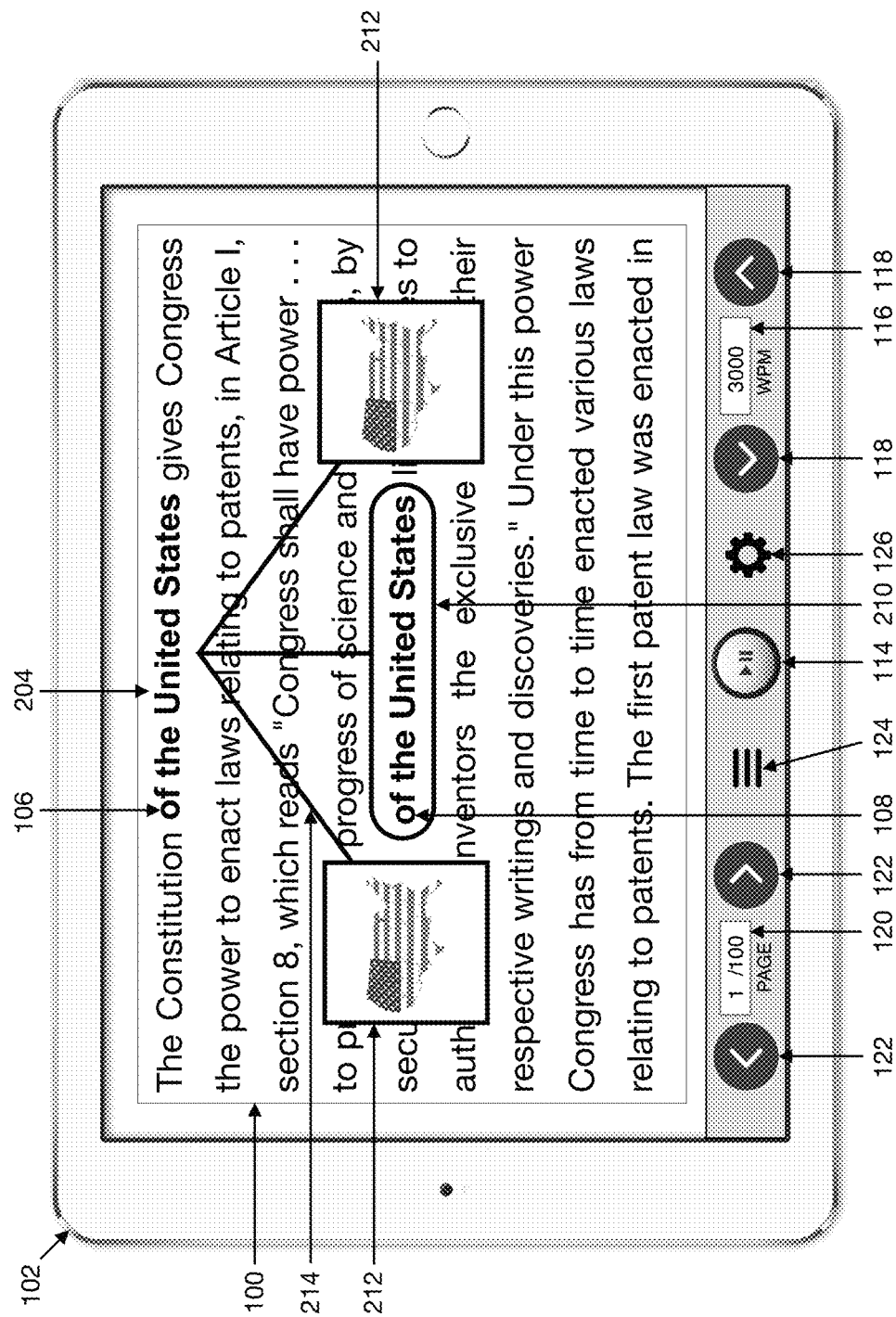
Figure 2C:
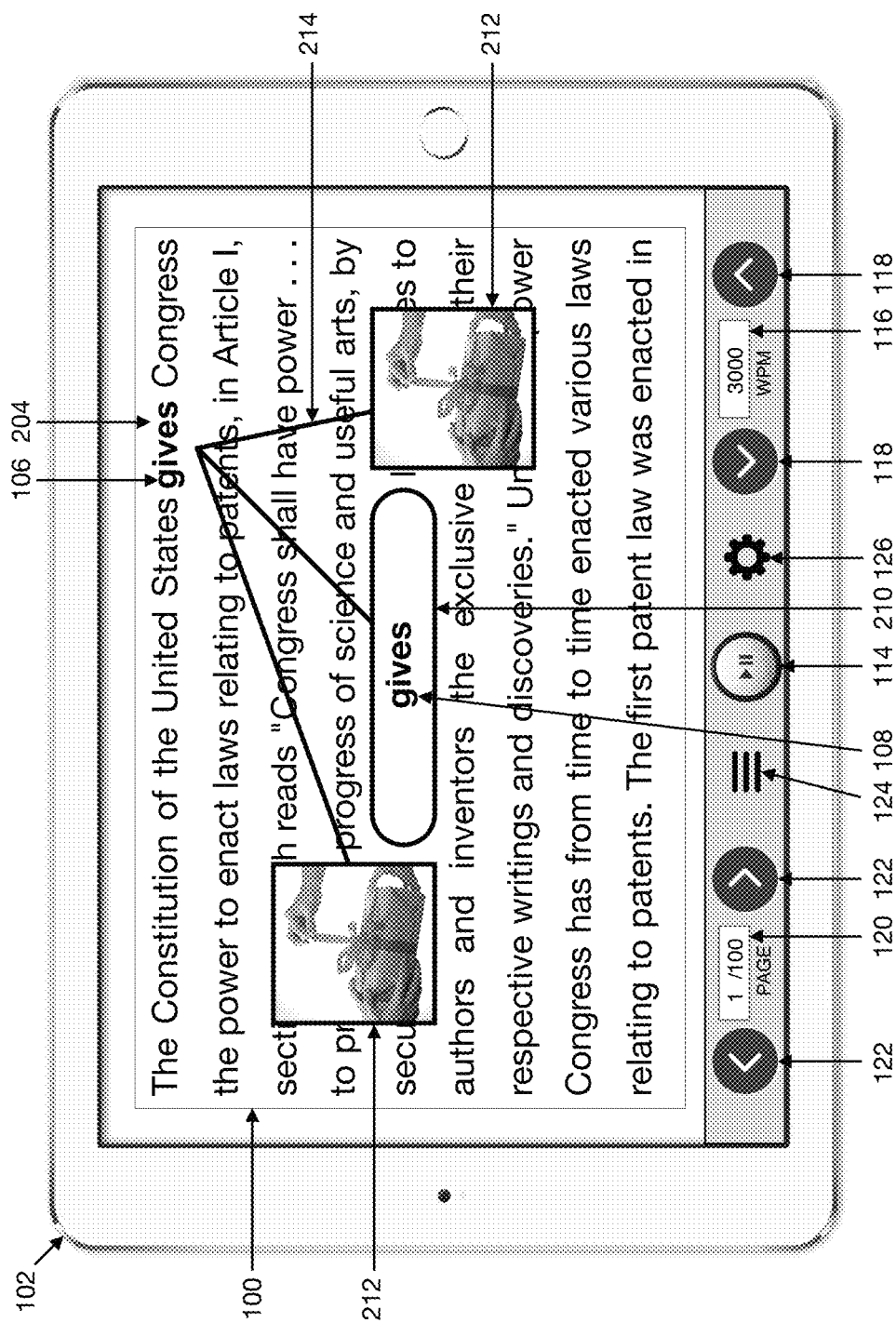
Figure 2D:
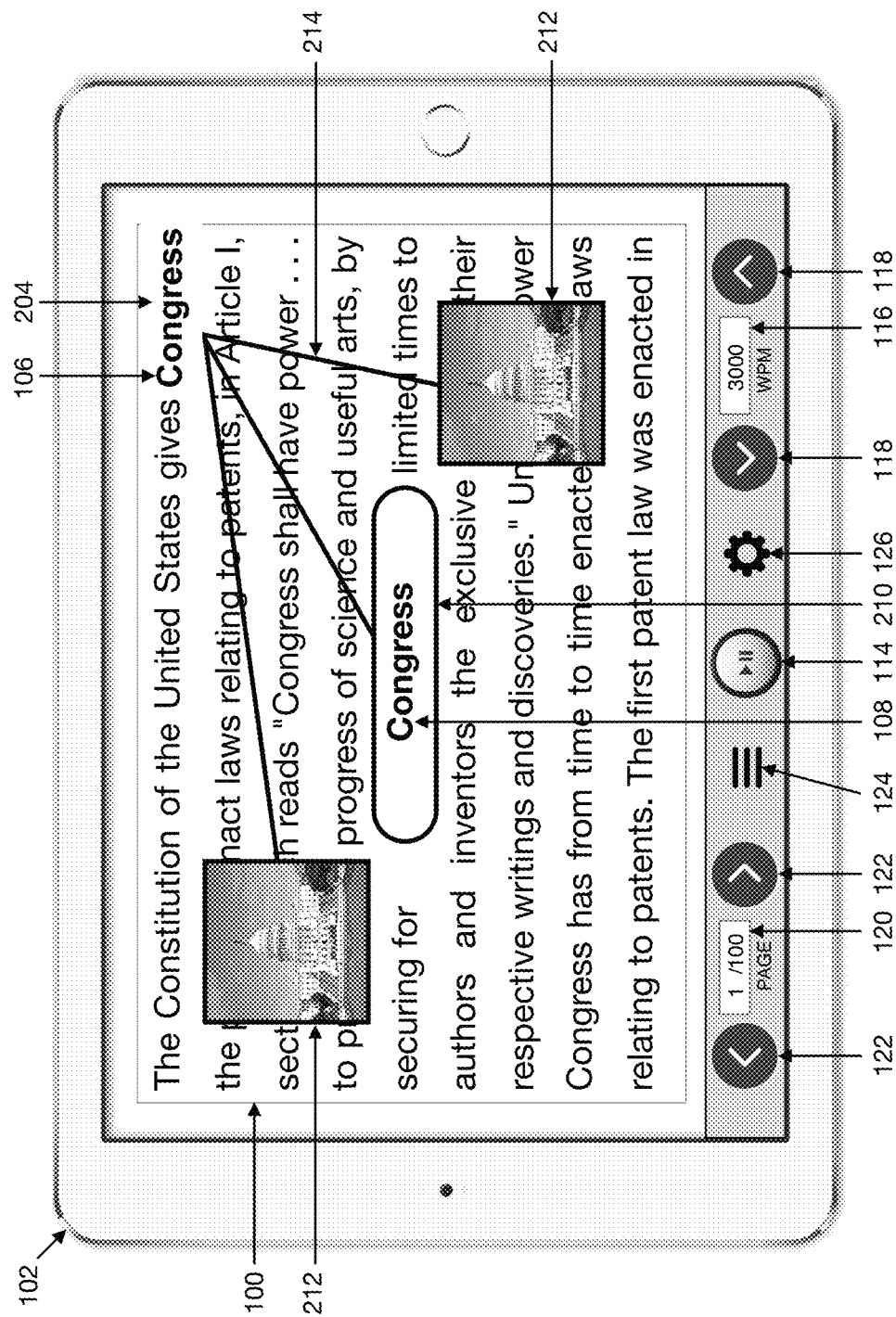
Figure 3A:
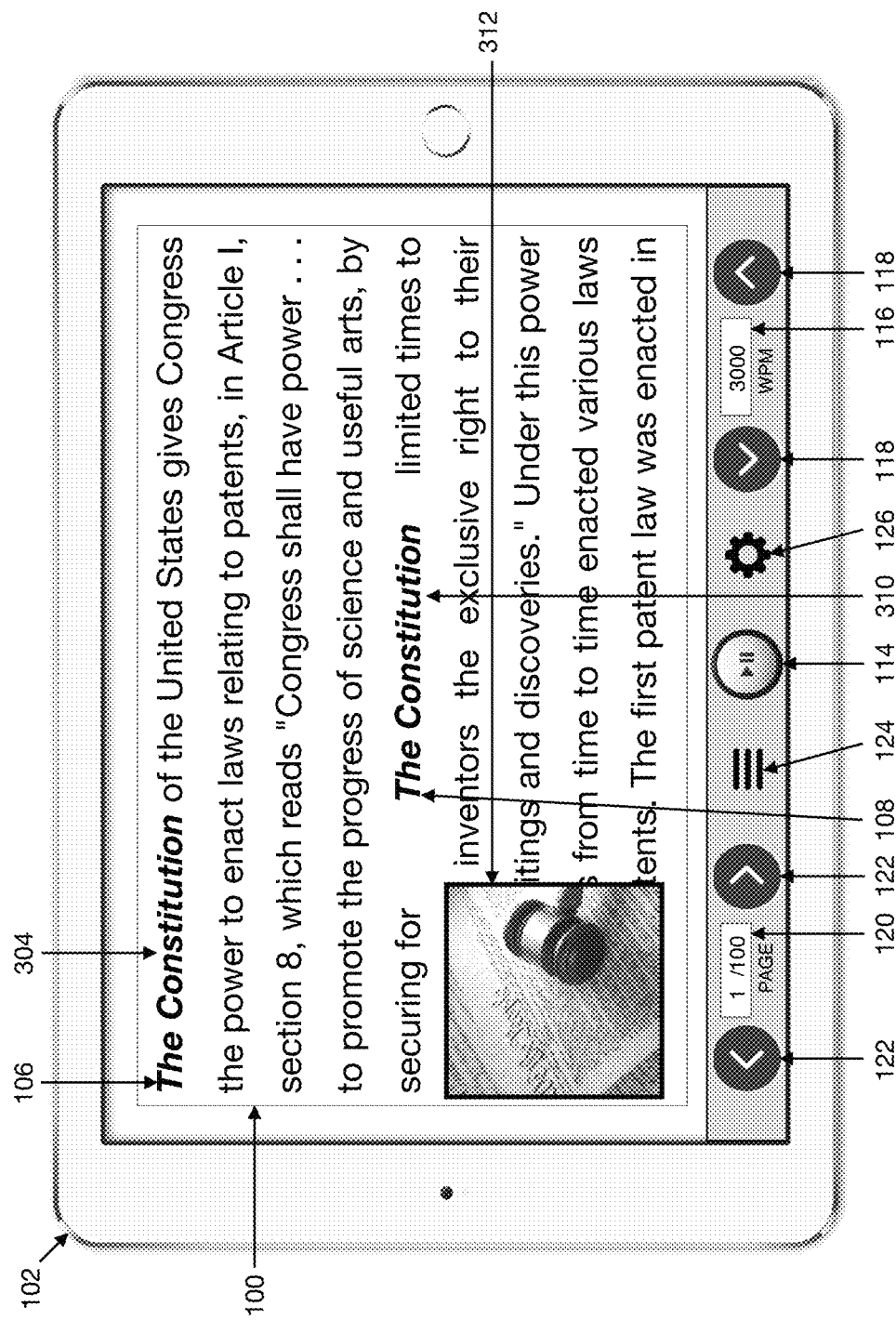
FIGS. 3A-3D constitutes a slide show of the animated format including: a body of text with a black font against a white background; highlighting via a bold and italic font; an additional expression with a bold and italic font; a cumulative pictorial representation of a line of textual content.
Figure 3B:
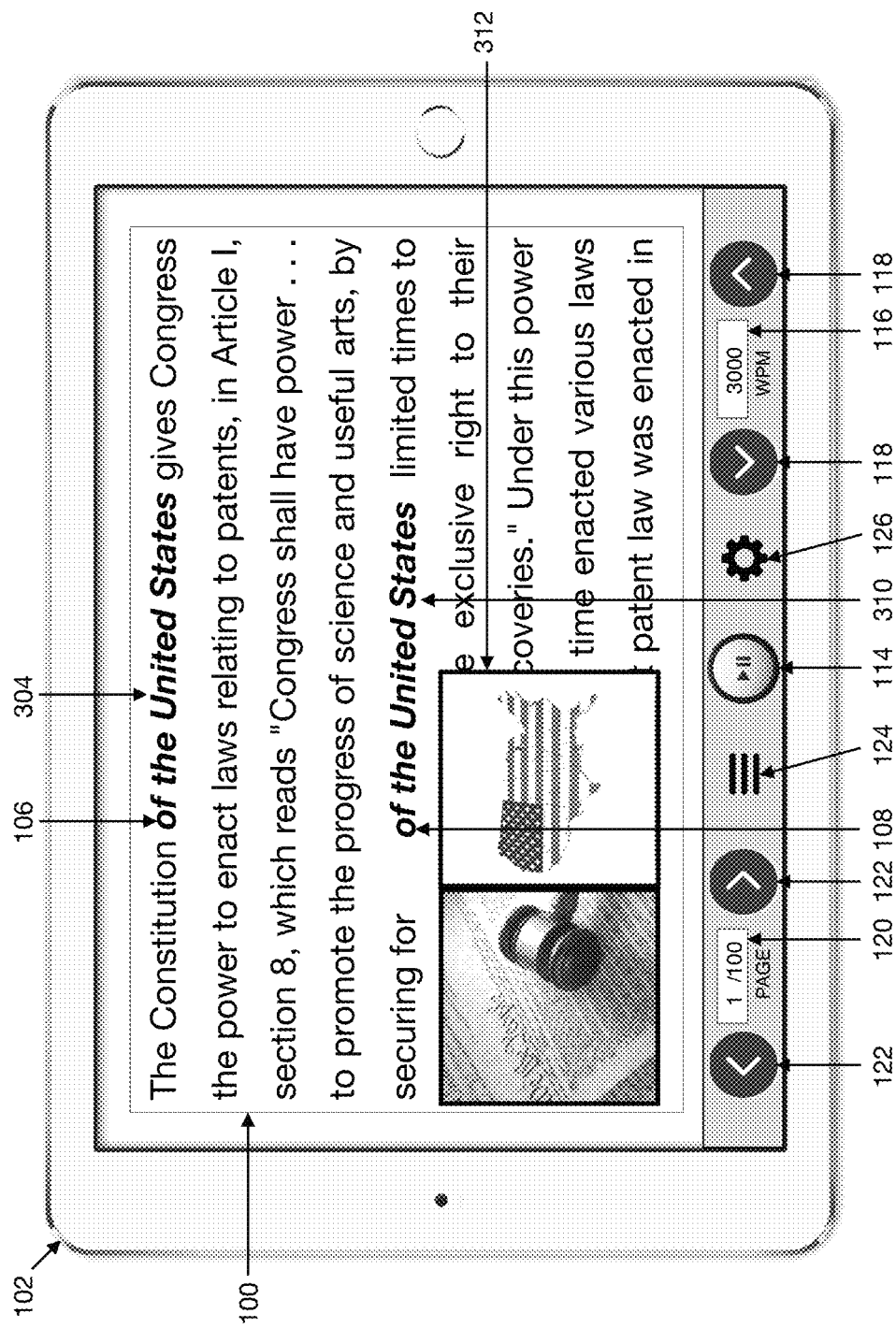
Figure 3C:
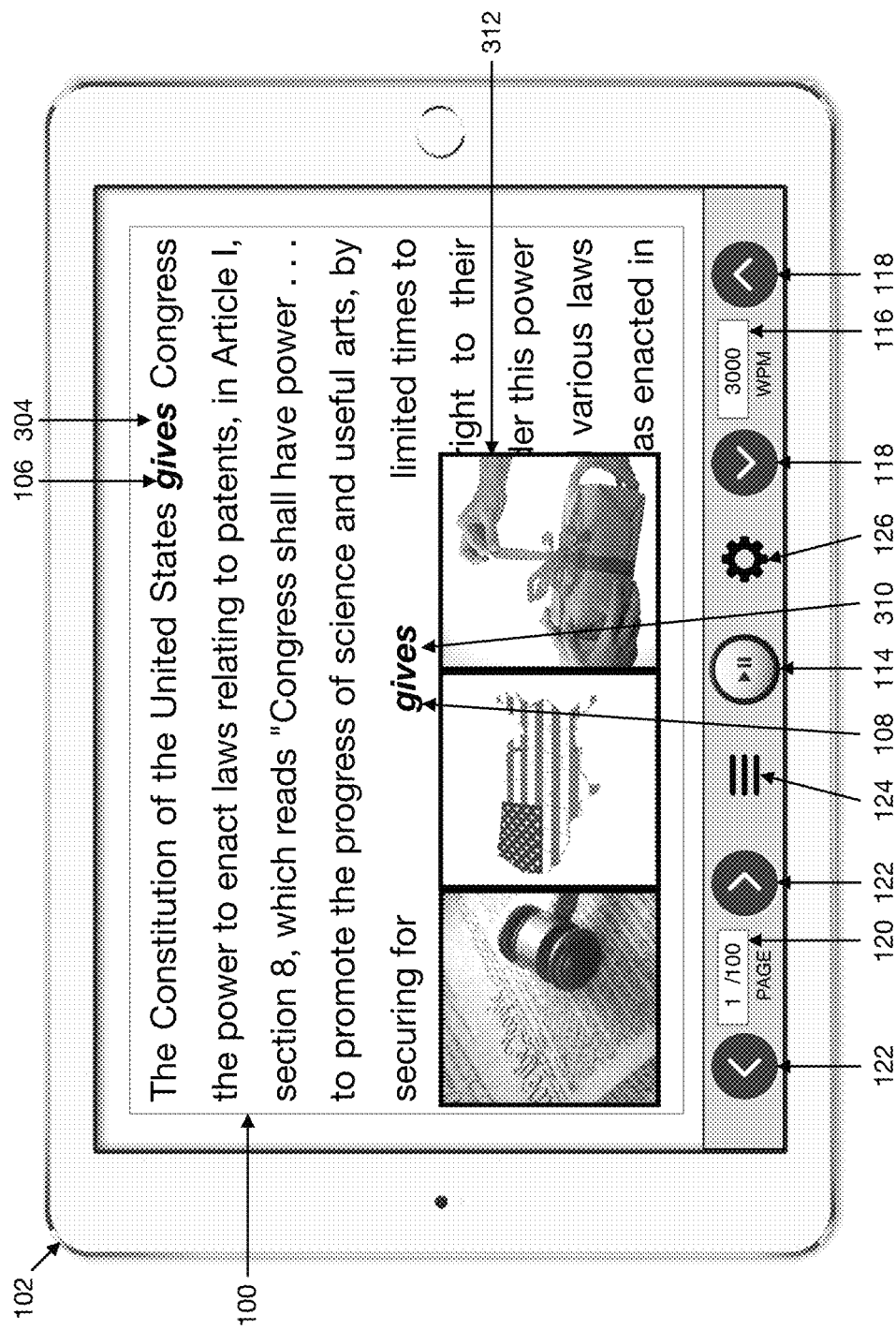
Figure 3D:
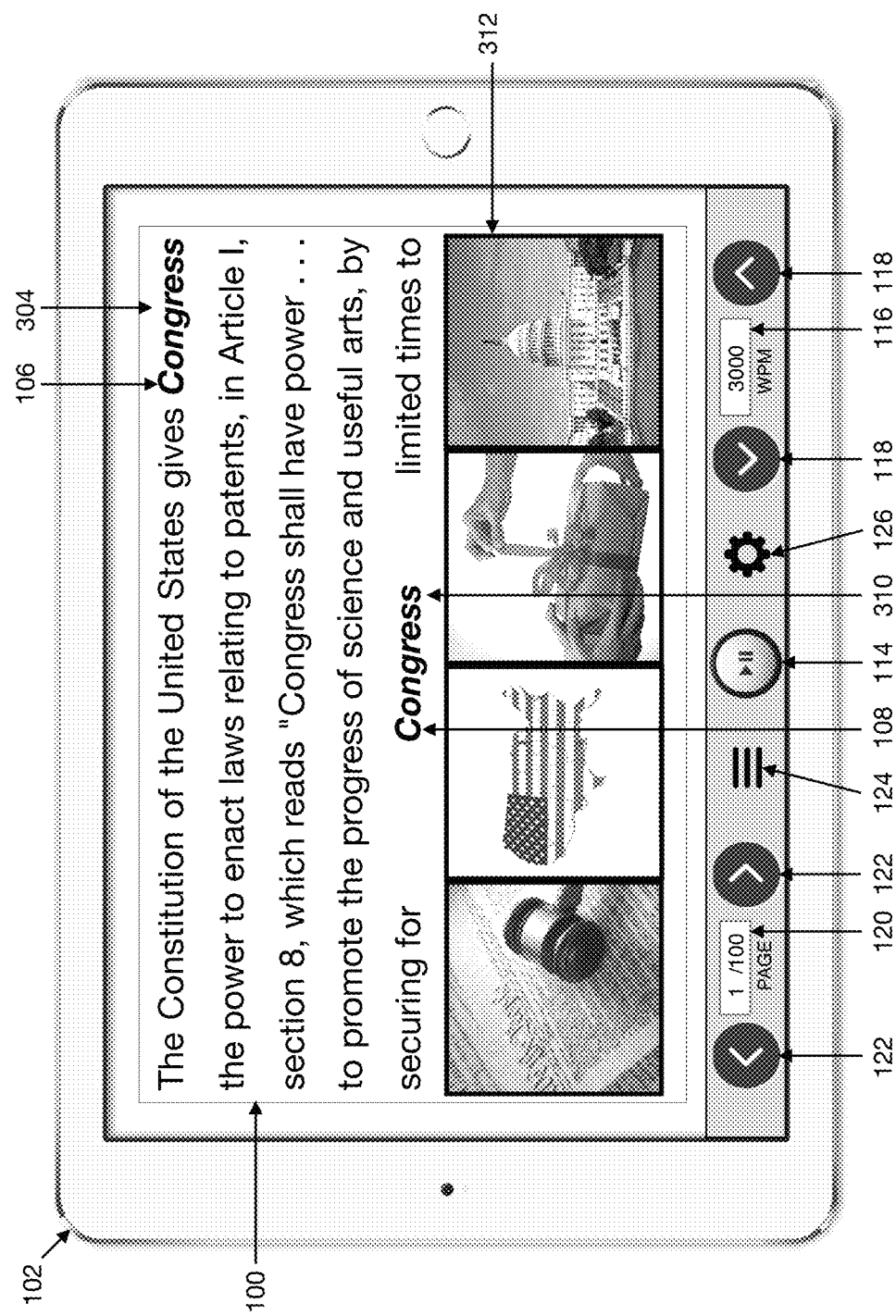
Figure 4A:
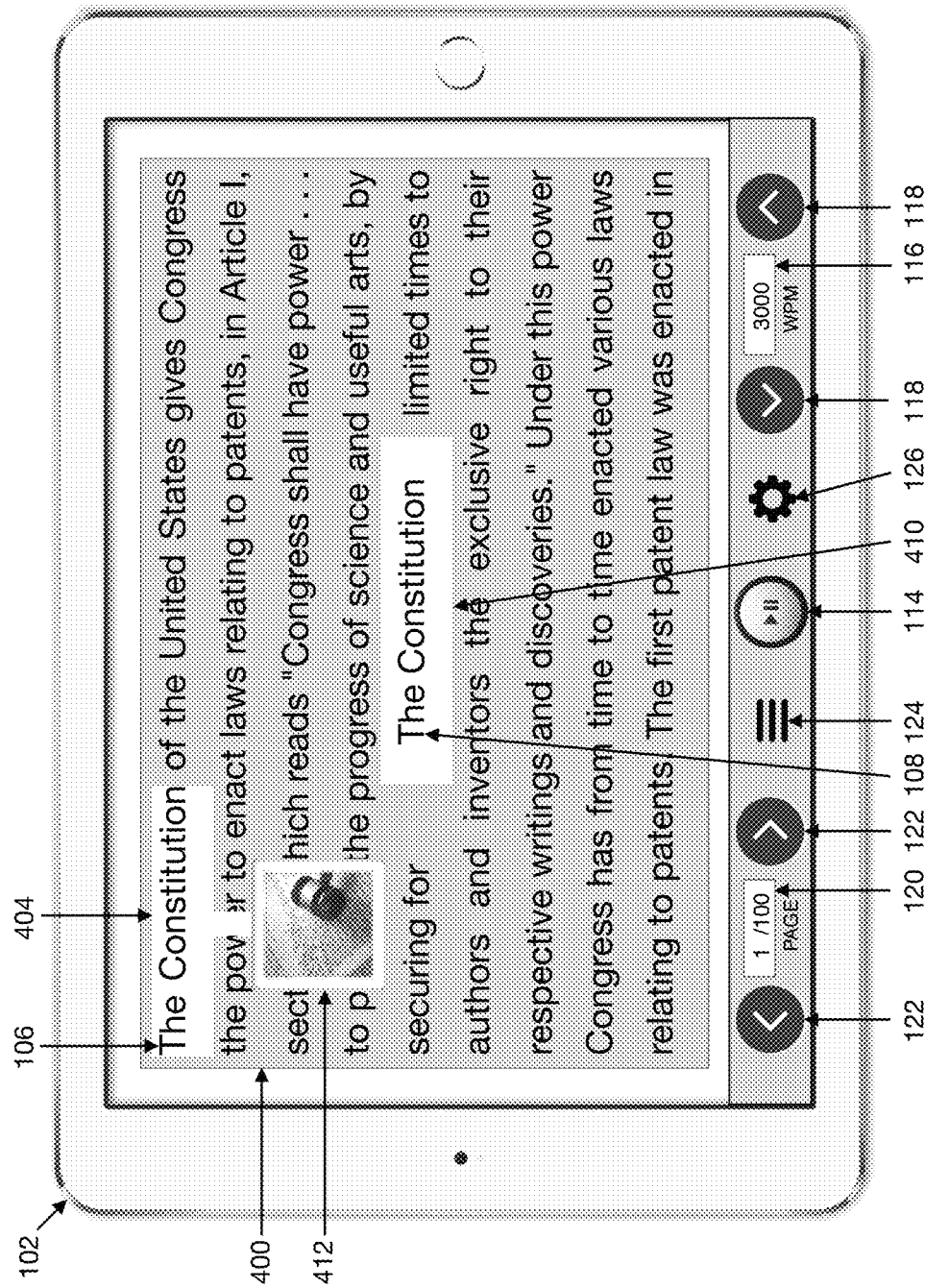
FIGS. 4A-4D constitutes a slide show of the animated format including: a body of text with a black font against a light grey background; highlighting via a white font background; an additional expression with a white font background; a single pictorial representation tracking the highlighting through a line of text.
Figure 4B:
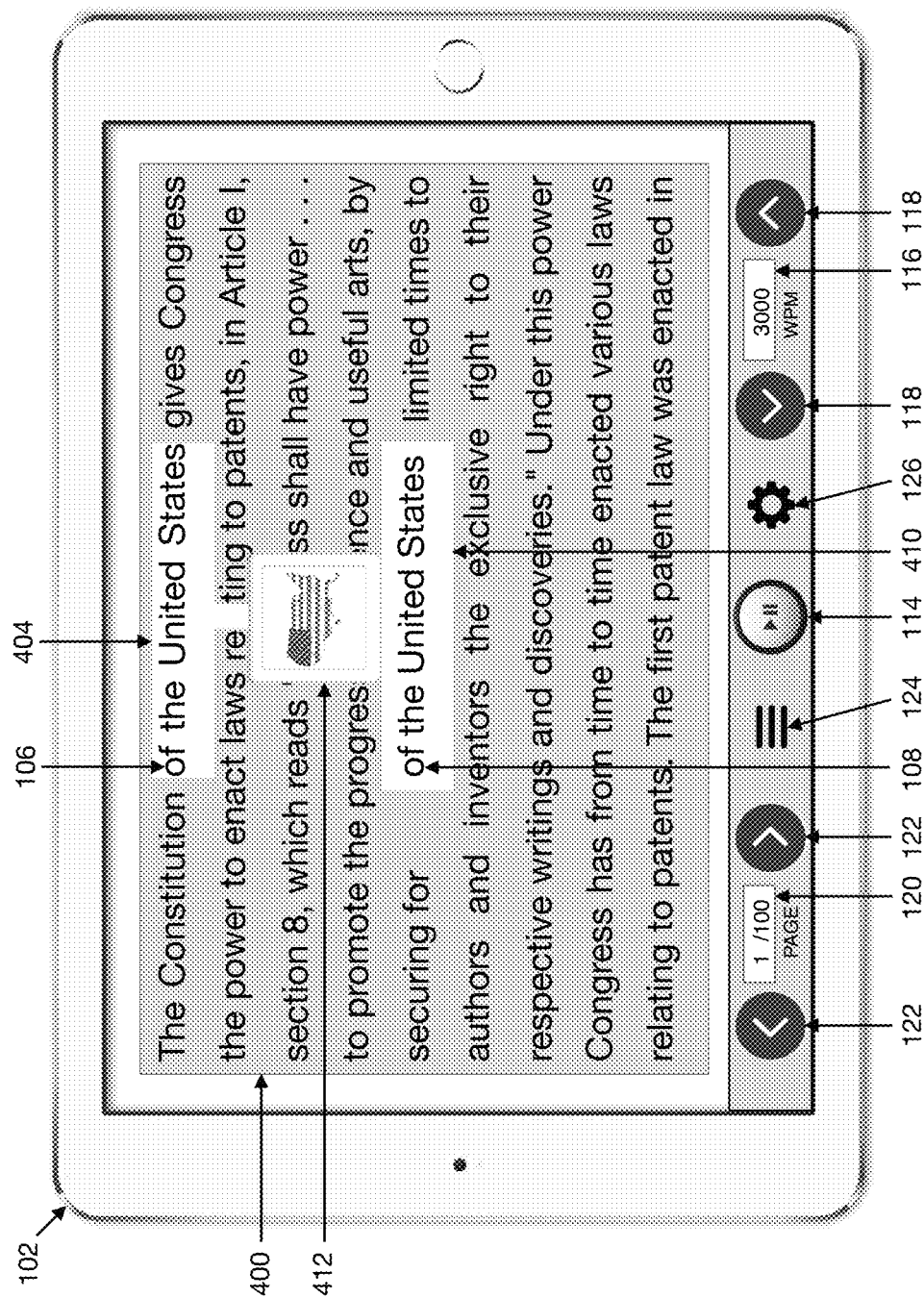
Figure 4C:
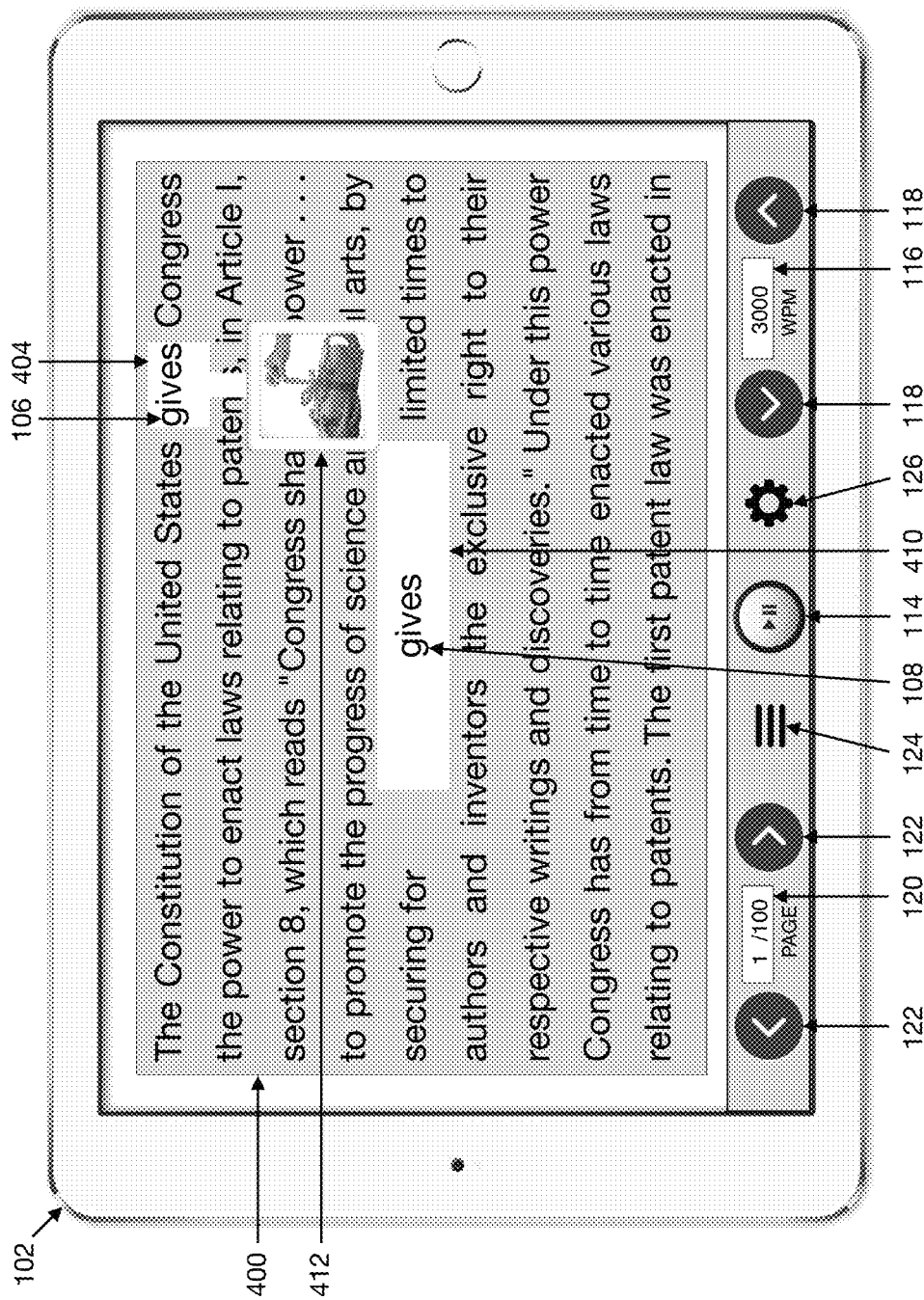
Figure 4D:
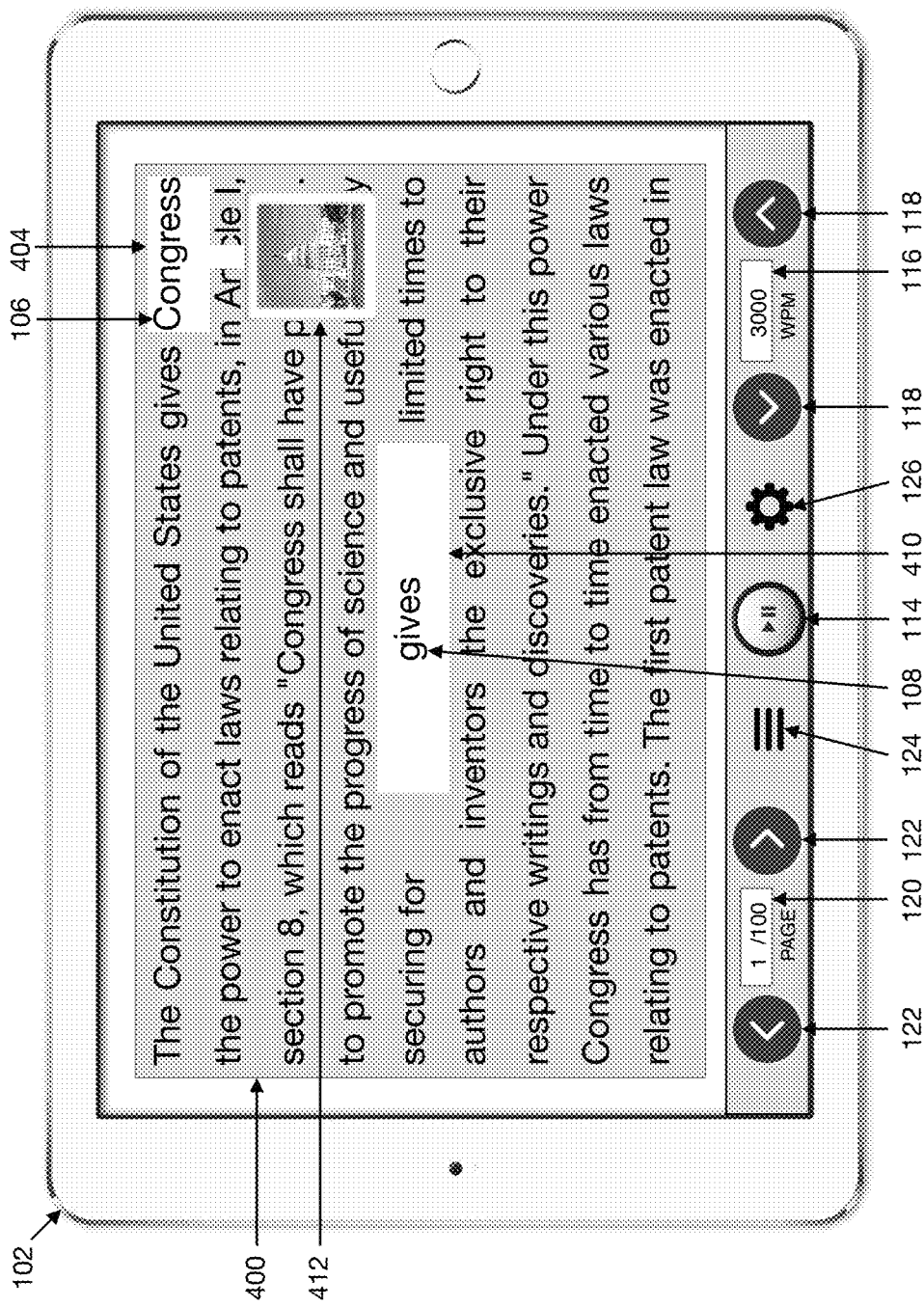

The system described in this document comprises a textual content speed player that presents a body of text on a computerized display in an animated format for the purpose of reconditioning reading behavior in order to increase reading speed and comprehension. Unlike conventional solutions, the system reconditions Traditional readers to engage in Speed reading behavior while requiring nothing more of the user than reading their choice of textual content presented in the system's animated format.

A textual content speed player includes: a method of highlighting a word or word group being read presently within a body of text; and displaying an additional expression of the word or word group being read presently in one or multiple positions on the computerized display. Unlike conventional solutions, the additional expression of the word or word group being read presently enables a Traditional reader to fix the eyes on a point, like a Speed reader, and still functionally read as described in the Additional Expression strategy. Unlike conventional solutions, the highlighting of words and/or word groups progressing through the body of text reconditions the Traditional reader to engage in the Speed reader's scanning strategy as describe in Additional Expression strategy.

An "additional expression" refers to a copy of a selected series of letter, numbers, spaces, symbols and/or punctuation from a body of text on a computerized display with or without the same aesthetic qualities as the selected series of letter, numbers, spaces, symbols and/or punctuation which is positioned in an additional location on the computerized display.

Textual content speed player also includes displaying a pictorial representation of the word or word group being read presently on the computerized display. Unlike conventional solutions, displaying a pictorial representation of a word or word group being read presently reconditions the reader to engage in the Speed reader's cognitive strategy as described in Picture Trigger strategy.

A "pictorial representation" refers to pictorial digital media in still or moving form (e.g., photograph, movie, illustration, animation, drawing, painting, etching, sketch, mono print, woodcutting and lithograph) used to represent the meaning of a word or word group visually.

Reading speed is generally expressed in units of words read per minute. The user sets a preferred reading speed in units of words per minute. The use can opt to also have the presentation of textual content timed based on words per minute. In this case, the system highlights a word or word group for a length of time using the strategy described in Word display speed mode. However, this is not the ideal embodiment. Alternatively, the system can use the set reading speed in words per minute to calculate the number of syllables per minute needed to create a presentation of textual content of equal duration.

The calculation of syllables per minute can be accomplished using a simple ratio between the total number of words in a body of text divide by the user's set reading speed in words per minute and the total number of syllables in the body of text divided by the syllables per minute. An example embodiment, of a formula that would calculate the syllable per minute is SPM=(TSYL×WPM)/TWRD, where: SPM is the syllables per minute; TSYL is the total number of syllables in the body of text, with a percentage of a syllable arbitrarily assigned to each space and form of punctuation added to the sum; WPM is the user's set reading speed expressed in words per minute; and TWRD is the total number of words in the body of text, with a percentage of a word arbitrarily assigned to each space and form of punctuation added to the sum.

Using the calculated syllables per minute, the system then displays the highlighting of the word or word group for a length of time using the strategy described in Syllable display speed mode. The presentation of textual content with timing based on syllables per minute flows naturally because the timing of the presentation is in sync with the natural timing of speech.

"Display speed mode" refers to the choice to display a highlighting of a word or word group for a length of time based on words per minute or syllables per minute.

Textual content speed player also includes the option of adding a vocal representation of a word or word group being read presently in the form of a recording of a human voice or a computer-generated voice. Unlike conventional solutions, the vocal representation completes the context necessary for the non-reader to enjoy textual content while learning to read printed language as describe in Complete Context strategy. Furthermore, children's books rendered in the system's animated format with a vocal representation added could teach children 2-5 years old to read while they are still learning the spoken form of the language taking advantage of the sponge-like state the brain of a child at that age is in.

"Vocal representation" refers to an audible representation of a word or word group being read presently using a computer generated voice or a recording of a human voice to speak the word or word group.

When using a device capable of audio recording, the user can read a body of text in the animated format out loud and the system will record the audio of the user speaking. An individual recording of each word spoken is created and associated with the word in a word/picture/vocal database so that the audio recording of the word spoken can be used to create a vocally enhanced textual presentation of not only the body of text the word was recorded in recitation of but also any body of text containing the word.

The audio recording can be created by reading a body of text in the animated format at the users set reading speed or by the user touching/clicking a word as they read the word out loud. The touching/clicking method allows for the creation of a vocally enhanced textual presentation of a body of text with an irregular reading rate. Unlike conventional solutions, this recorded reading process enables a parents to read their child a book so that the child can re-experience, at a later time, the book being read to them in the animated format by the parent ad infinitum.

Example Embodiments

In an example embodiment seen in FIGS. 1A-1D, a body of text 100 is displayed with a regular, 15 point, Helvetica Neue font in black against a white background using a tablet computer 102. The method of highlighting 104 in the body of text 100 is placing a rectangle around the word or word group being read presently 106. A single additional expression 108 of the word or word group being read presently 106 is displayed in the center of the body of text 100 and is made to stand out by placing the additional expression 108 in a rectangle 110. Dual pictorial representations 112 are displayed in fixed positions to the left and right of the additional expression 108, in the space the highlighting is not currently using, in this case, below the additional expression.

In an example embodiment seen in FIGS. 2A-2D, a body of text 100 is displayed with a regular, 15 point, Helvetica Neue font in black against a white background using a tablet computer 102. The method of highlighting 204 in the body of text 100 is making the font of the word or word group being read presently 106 bold combined with a pointer animation 214 created with lines extending from both the rounded rectangle 210 and the pictorial representations 212 toward the word or word group being read presently 106. A single additional expression 108 of the word or word group being read presently 106 is displayed in the center of the body of text 100 and is made to stand out by placing the additional expression 108 inside a rounded rectangle 210 and making the font bold. Dual pictorial representations 212 are displayed to the left and right of the additional expression 108 in positions that relocate vertically as the highlighting 204 of words and/or word groups 106 progresses through the body of text 100.

In an example embodiment seen in FIGS. 3A-3D, a body of text 100 is displayed with a regular, 15 point, Helvetica Neue font in black against a white background using a tablet computer 102. The method of highlighting 304 in the body of text 100 is making the font of the word or word group being read presently 106 bold and italic. A single additional expression 108 of the word for word group being read presently 106 is displayed in the center of the body of text 100 and made to stand out by making the font bold and italic 310. As the highlighting 304 of words and/or word groups 106 progresses left to right through a line of text, pictorial representations 312 are displayed and remain in fixed positions, in the space the highlighting is not currently using, in this case, below the additional expression 108, starting on the left with successive pictorial expressions being added on the right of the previous, until highlighting 304 of the line of text is complete creating a cumulative pictorial expression of the entire line of text.

In an example embodiment seen in FIGS. 4A-4D, a body of text 400 is displayed with a regular, 15 point, Helvetica Neue font in black against a light grey background using a tablet computer 102. The method of highlighting 404 in the body of text 400 is making the font background of the word for word group being read presently 106 white. A single additional expression 108 of the word or word group being read presently 106 is made to stand out from the rest of the body of text 400 by making the font background white 410. A single pictorial representation 412 tracks the highlighting 404 of the words or word group being read presently 106 through a line of text.

In example embodiments seen in FIGS. 1A-1D, 2A-2D, 3A-3D & 4A-4D, a body of text 100/400 is displayed using a tablet computer 102. Alternatively, any computerized display could be used to run textual context speed player.

A "computerized display" refers to a digital visual display device (e.g., LCD monitor/tv, plasma monitor/tv, CRT monitor/tv, laptop computer screen, tablet computer screen, eyeglass computer screen, digital projector and cell phone screen) connected to a computerized device (e.g., desktop computer, network computer, laptop computer, tablet computer, cell phone, mainframe computer, super computer, mini computer, micro computer, work station computer, PDA computer, enterprise server computer, smart watch computer, eyeglass computer, clothing computer and streaming device computer).

In an example embodiments seen in FIGS. 1A-1D, 2A-2D, 3A-3D, the body of text 100 is created with a regular, 15 point, Helvetica Neue font in black against a white background. In an example embodiment seen in FIGS. 4A-4D, a body of text 400 is created with a regular, 15 point, Helvetica Neue font in black against a light gray background. There are countless variations that could be created and successfully implemented in displaying a body of text with all the possible combinations of font characteristics, background color and line spacing.

"Font characteristics" refers to aesthetic variations in a type face and the space immediately surrounding the type face including font (e.g., Arial, Times new roman, Courier and Helvetica Neue), font size, font type (e.g., bold, italic, underlined, outline, strikethrough, shadow, superscript and subscript), font style (e.g., condensed black, thin, light, medium and regular), font color, font background color, character spacing, baseline shift and capitalization (e.g., all caps, small caps and title case).

In an example embodiment seen in FIGS. 1A-1D, the method of highlighting 104 is placing a rectangle around the word or word group being read presently 106 in the body of text 100. In an example embodiment seen in FIGS. 2A-2D, the method of highlighting 204 is making the font of the word or word group being read presently 106 in the body of text 100 bold. In an example embodiment seen in FIGS. 3A-3D, the method of highlighting 304 is making the font of the word or word group being read presently 106 in the body of text 100 bold and italic. In an example embodiment seen in FIGS. 4A-4D, the method of highlighting 404 is making the font background of the word or word group being read presently 106 in the body of text 400 white. There are countless variations that could be created and successfully implemented as a method of highlighting with all the possible combinations of font characteristics, use of a pointer, underlining, use of textual animation and enclosing in a shape.

"Highlighting" refers to altering the aesthetic qualities of a selected section of a computerized display and/or a selected series of letters, numbers, spaces, symbols and/or punctuation contained in the selected section of the computer display in order to make the selected section of the computerized display and the selected series of letters, numbers, spaces, symbols and/or punctuation stand out from the unselected section of the computer display containing the unselected letters, numbers, spaces, symbols and/or punctuation.

"textual animation" refers to continually altering the aesthetic qualities of a selected section of a computerized display and/or a selected series of letters, numbers, spaces, symbols, punctuation and/or graphic elements contained in the selected section of the computer display in order to create a sense of motion (e.g.: pointer animation, which creates a pointer directed at the highlighted word or word group; movement animation, which moves an element such as a shape, underline or font; font characteristic animation, which changes the font characteristics during display; size animation, which changes the size of a non-textual element such as a shape, underline or pointer; and border animation, which animates the border of a shape or underline.)

In an example embodiment seen in FIGS. 1A-1D, the additional expression 108 of the word or word group being read presently 106 displayed in the center of the body of text 100 is made to stand out by placing the additional expression 108 in a rectangle 110. In an example embodiment seen in FIGS. 2A-2D, the additional expression 108 of the word or word group being read presently 106 displayed in the center of the body of text 100 is made to stand out by placing the additional expression 108 in a rounded rectangle and making the font bold 210. In an example embodiment seen in FIGS. 3A-3D, the additional expression 108 of the word or word group being read presently 106 displayed in the center of the body of text 100 is made to stand out by making the font bold and italic 310. In an example embodiment seen in FIGS. 4A-4D, the additional expression 108 of the word or word group being read presently 106 displayed in the center of the body of text 400 is made to stand out by making the font background color white 410. There are countless variations that could be created and successfully implemented as a method of making the additional expression stand out with all the possible combinations of font characteristics, separating with space, underlining, use of textual animation and enclosing in a shape.

The fastest Speed readers fix their eyes on a page of text in 3 places. In example embodiments seen in FIGS. 1A-1D, 2A-2D, 3A-3D & 4A-4D, one additional expression 108 of the word or word group being read presently 106 is displayed in a position at the center of the body of text 100/400 which constitutes one fixation. While a single additional expression in the center of the computerized display is the ideal embodiment, textual content speed player allows users to choose multiple positions for the display of the additional expression. Those positions would be spread out evenly along an imaginary vertical line, ideally, in the center of the computerized display so that each additional expression is at the center of its own section on the computerized display with each section having an equal number of lines of text. However, the user has the option to select custom positions by touching or clicking each additional expression and dragging it to a preferred location on the computer display.

In an example embodiments seen in FIGS. 1A-1D, 2A-2D, 3A-3D & 4A-4D, photographs and illustrations are displayed as pictorial representations 112, 212, 312, 412 intended to visually represent the meaning of the word or word group being read presently. Alternative forms of pictorial representations, exemplified in the definition of "pictorial representation," could also be implemented successfully to recondition the user to trigger recognition of meaning with a picture.

In an example embodiment seen in FIGS. 1A-1D, duplicate pictorial representations 112 are presented in fixed positions to the left and right of the additional expression 108, in the space the highlighting 104 of the word or word group being read presently 106 is not currently using, in this case, below the additional expression 108. In an example embodiment seen in FIGS. 2A-2D, Dual pictorial representations 212 of the word or word group being read presently 106 are presented to the left and right of the additional expression 108 in positions that relocate vertically as the highlighting 204 of words and/or word groups 106 progresses through a line of text 100. In an example embodiment seen in FIGS. 3A-3D, As the highlighting 304 of words and/or word groups 106 progresses left to right through a line of text, single pictorial representations 312 are displayed and remain in a fixed positions, in the space the highlighting is not currently using, in this case, below the additional expression, starting on the left, with successive pictorial expressions 312 being added on the right of the previous, until highlighting 304 of the entire line of text is complete creating a cumulative pictorial representation of the entire line of text. In an example embodiment seen in FIGS. 4A-4D, a single pictorial representation 412 tracks the highlighting 404 of the word or word group being read presently 106 through a line of text.

Pictorial representations that are displayed: in a fixed position; in a position that relocates s in response to the movement of the highlighting of words and/or word groups progressing through a line of text; building a cumulative pictorial representation representing an entire line of textual content; and tracking the highlighting of words and/or word groups progressing through a line of text all are effective "pictorial representation behaviors" for reconditioning a user to trigger recognition of meaning with a picture. There are countless variations that could be created and successfully implemented as a method of displaying pictorial representations with all the potential combinations of pictorial representation behavior, size, quantity and framing.

System Architecture

Figure 5A:
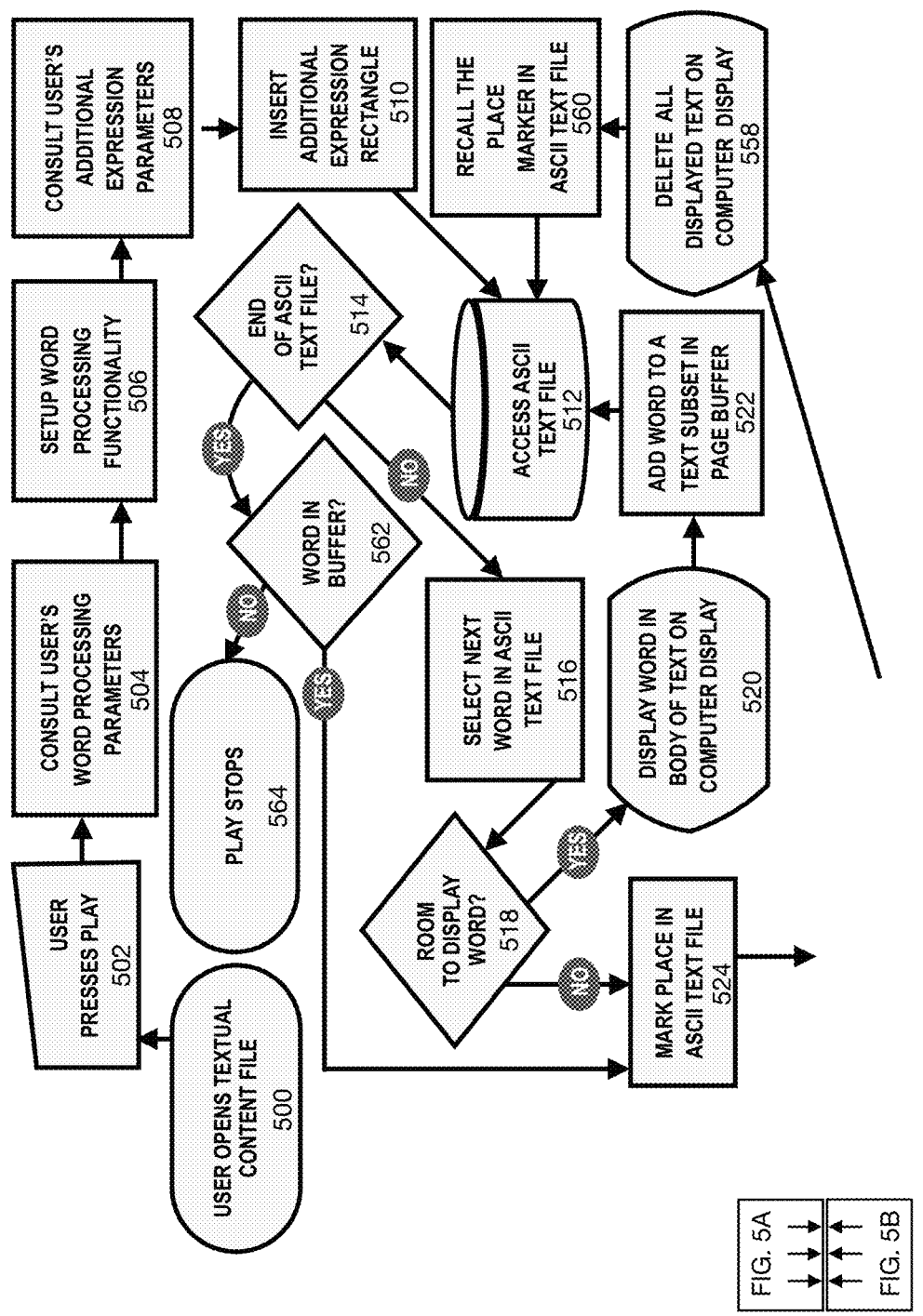
FIGS. 5A and 5B combined constitute a workflow diagram representing the computer code implemented to create the core functionality of a textual content speed player.
Figure 5B:
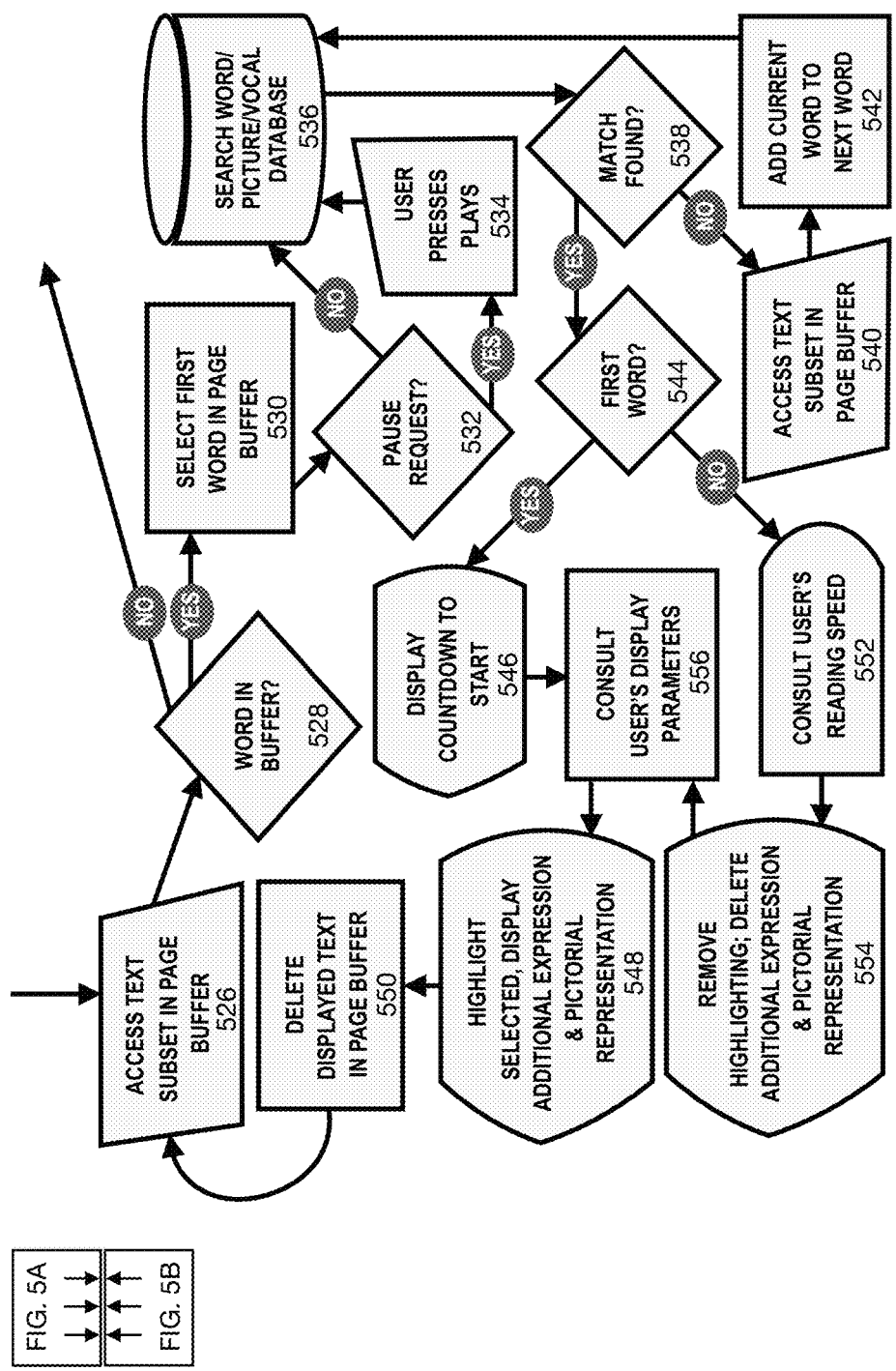

According to example embodiments of the present invention, the system utilizes reconditioning strategies of a textual content speed player to present textual content in an animated format. The following workflow diagrams are presented in order to detail exemplary embodiments of the present methodology. When FIGS. 5A and 5B are combined, a workflow diagram is shown such that a person skilled in the art could use to create the core functionality of a textual content speed player.

The example embodiment will include, by proxy, computer code commonly used in word processing. Herein, the common elements and behaviors of a text document in a word processing computer program are referred to as "word processing functionality" and the adjustments a user is able to make to a text document in a word processing computer program as "word processing parameters."

In the example embodiment, the system is already running. As seen in FIG. 5A, the user starts the process by opening a textual content file 500 in the system containing a book, magazine or newspaper in a file format including an ASCII text file and presses play 502 to start reading.

In the example embodiment, the user has previously selected word processing parameters necessary for displaying a body of text on a computerized display including font characteristics, background color and line spacing. The system then consults the user's selected word processing parameters 504 and uses the parameters to set-up basic word processor functionality 506 similar to in a word processor document.

In this example embodiment, the user has selected as additional expression parameters to have one additional expression positioned in the center of the body of text and made to stand out by placing the additional expression in a rectangle. The system then consults the user's additional expression parameter 508 and inserts a rectangle 510. As in typical word processor functionality, any text added to the body of text on the computer display will wrap around the rectangle instead of overwriting the rectangle.

The system then accesses the ASCII text file 512 and determines if the cursor is at the end of the ASCII text file 514, which will become important later. The answer to this question at present is no, so the system selects the next word in ASCII text file 516 which in this case is the first word in the ASCII text file. Next the system determines if their is room to display the selected word 518 in the body of text on the computerized display. The answer to this question at present is yes, so the system displays the selected word in the body of text on the computerized display 520.

The system has a block of memory set aside for containing a subset of the text in the ASCII text file. Herein this block of memory is referred to as the "page buffer" and the group of words it contains as the "text subset".

Next the system adds the selected word to the text subset in the page buffer 522. The system then accesses the ASCII text file 512 and determines if the cursor is at the end of the ASCII text file 514. The answer to this question at present is no, so the system selects the next word in ASCII text file 516. Next the system determines if their is room to display the selected word in the body of text on the computerized display 518. The answer to this question at present is yes, so the system displays the selected word in the body of text on the computerized display 520.

The process of: determining yes, there is room to display the word in the body of text on the computerized display 518; displaying the selected word in the body of text on the computerized display 520; adding the selected word to the text subset in the page buffer 522; accessing the ASCII text file 512; determining no, the cursor is not at the end of the ASCII text file 514; selecting the next word in the ASCII text file 516; and again determining if there is room to display the selected word on the computerized display 518 continues until the body of text on the computerized display is full which changes the answer to determining if there is room to display the selected word on the computerized display 518 to no.

Displaying the body of text of the first page is complete which to the user is an instantaneous process. The system then marks the cursor's place in the ASCII text file 524 after the previous word which was successfully displayed. The flow of the diagram continues down to FIG. 5B.

In FIG. 5B, in the upper left hand corner, the flow of the diagram continues from FIG. 5A. The system then accesses the text subset in the page buffer 526. The page buffer is filled with all the words now displayed in the body of text of the first page. The system then determines if there is at least one word in the page buffer 528, which will become important later. The answer to this question at present is yes, so the system selects the first word in the page buffer 530.

At this point, the system determines if the user has requested a pause in play 532. If the answer is yes, the user has requested a pause in play, the system will pause the workflow which to the user will appear as instantaneous upon pressing the play/pause button 114, as seen in FIGS. 1A-1D, 2A-2D, 3A-3D & 4A-4D. The system will then hold until the user presses play 534 which results in the system resuming the workflow. If the user has not requested a pause in play the system moves on to the next step in the workflow 536.

The system has access to a database containing words and word groups each connected to their corresponding pictorial representation and vocal representation in individual data sets. The database, referred to herein as the "word/picture/vocal database", contains data sets for the approximately 180,000 words in human language. The system then searches for the word it has selected from the page buffer in the word/picture/vocal database 536. The system then determines if a match has been found 538.

Not all words will result in a determination of yes, a match has been found. The word "the," for example, will return a determination of no, a match has not been found, because the word "the" should not be presented on its own but instead in front of a second word. In response to a determination of no, a match has not been found, The system accesses the text subset in the page buffer 540 and adds the currently selected word to the next word in the page buffer 542. The system then searches the word/picture/vocal database 536 for the combined term. The system again determines if a match has been found for the combined term 538.

If the first word selected from the page buffer is not a combined term, the system determines that yes, a match has been found 538. The system then determines if the selected word from the page buffer is the first word 544 displayed in the body of text on the computerized display. The answer to this question at present is yes, so the system displays a short countdown 546, two or three seconds, in the rectangle reserved for displaying the additional expression of the word or word group being read presently. The countdown draws the user's attention to the rectangle and settles the user in preparation for beginning the reading process. When the countdown is complete, the system then consults the user selected display parameters 556 containing: the method of highlighting for the word or word group being read presently in the body of text; the font characteristics for the additional expression in the rectangle; the number, size, framing and behavior associated with displaying pictorial representations. The system then [highlights the word or words group being read presently in the body of text; displays the additional expression of the word or word group being read presently in the rectangle; and displays the pictorial representations] 548 on the computerized display. The system then deletes the selected word that is currently being displayed on the computerized display from the text subset in the page buffer 550.

The system then accesses the text subset in the page buffer 526 and determines if there is at least one word remaining of the text subset in the page buffer 528. The answer is to the question is yes, so the system then selects the first word in the page buffer 530 which is actually the second word in the body of text displayed on the computerized display since the first word in the body of text displayed on the computerized display has been deleted from the text subset in the page buffer. If the system then determines that no, the user has not requested a pause 532; the system then searches the word/picture/vocal database 536; and let's say determines that yes, a match has been found 538. The system then determines if the selected word is the first word displayed in the body of text 544 on the computerized display. If the result is negative, the system consults the user selected reading speed 552 in order to create a delay of the appropriate length of time necessary for the user to read the currently displayed content. When the delay has concluded, the system removes the highlighting of the word being read presently; deletes the additional expression of the word being read presently in the rectangle; and deletes the pictorial representations 554, from the computerized display. The system then consults user selected display parameters 556 and [highlights the word or word group being read presently in the body of text; displays the additional expression of the word or word group being read presently in the rectangle; and displays the pictorial representations] 548 on the computerized display. The system then deletes the selected word that is currently being displayed on the computerized display from the text subset in the page buffer 550. The system then accesses the text subset in the page buffer 526 and determines if there is at least one word remaining of the text subset in the page buffer 528.

The system continues the process of: determining if there is at least one word remaining of the text subset in the page buffer 528; selecting the first word in the page buffer 530; determining no, the user hasn't requested a pause 532; searching the picture/word/vocal database 536; determining that yes, a match has been found 538 or no and going through the sub-process (540, 542, 536, 538) to find a combined term match; determining that no, the selected word is not the first word in the body of text 544; consulting the user's selected reading speed 552; [removing the highlighting of the word or word group being read presently; deleting the additional expression of the word or word group being read presently in the rectangle; and deleting the pictorial representations] 554; consulting the user's selected display parameters 556; [highlighting the word or word group being read presently in the body of text; displaying the additional expression of the word or word group being read presently in the rectangle; and displaying the pictorial representations] 548; deleting the displayed text form the text subset in the page buffer 550; accessing the text subset in the page buffer 526 and again determining if there is at least one word remaining of the text subset in the page buffer 528 until all the words and/or word groups in the body of text have been highlighted and therefore deleted from the text subset in the page buffer.

The system then determines no, there is not at least one word remaining of the text subset in the page buffer 528, as the page buffer is empty. The flow of diagram then goes back up to FIG. 5A.

Presentation of the first page is complete so the system must make way for the second page. As shown in FIG. 5A, the system deletes all displayed text on the computerized display 558. The system recalls the cursor's place marker in the ASCII text file 560, so it can begin to display the body of text of the second page on the computerized display, and then accesses the ASCII text file 512.

The process, starting from the first time the system accessed the ASCII text file 512 to start to display the body of text of the first page until the current step of accessing the ASCII text file 512 to start to display the body of text on the second page replicates to display the body of text and highlight all remaining pages, save the last page.

Fast forward, the current step is the system accessing the ASCII text file 512 to start to display the body of text of the last page. The process of: accessing the ASCII text file 512; determining no, the cursor is not at the end of the ASCII text file 514; selecting the next word in the ASCII text file 516; determining yes, there is room to display the word in the body of text on the computerized display 518; displaying the selected word in the body of text on the computerized display 520; adding the selected word to the text subset in the page buffer 522; and again accessing the ASCII text file 512 continues until all the words of the last page have been displayed in the body of text on the computerized display.

After the last word in the ASCII text file has been displayed in the body of text on the computerized display 520 and added to the text subset in the page buffer 522, the system will then access the ASCII text file 512 and then determine if the cursor has reached the end of the ASCII text file 514. The answer to the question will now be yes, so the system will then determine if there is at least one word remaining in the text subset in the page buffer 562. The answer to this question will be yes, so the system will mark the cursor's place in the ASCII text file 524. The flow of the diagram moves down to FIG. 5B.

The system then accesses the text subset in the page buffer 526. The process, starting from the step where the system: determines if there is at least one word remaining of the text subset in the page buffer 528 and finishing where [the currently displayed word or word group is deleted from the text subset in the page buffer 550; the system accesses the text subset in the page buffer 526; and again determines if there is at least one word remaining of the text subset in the page buffer 528] continues until all words or word groups have been presented in the animated format and all words of the text subset in the page buffer have been deleted. Since all words in the body of text on the last page have been presented in the animated format the page buffer is therefore empty. As a result, the system determines that no, there is not at least one word remaining of the text subset in the page buffer 528.

The flow of the diagram moves back up to FIG. 5A. The system deletes all text displayed on the computerized display 558. The system then recalls the cursor's place marker in the ASCII text file 560 which is now at the end of the ASCII text file. The system accesses the ASCII text file 512 and then determines if the cursor has reached the end of the ASCII text file 514. The answer to this question is yes, so the system then determines if there is at least one word remaining of the text subset in the page buffer 562. The answer to this question is now no, so the system stops play 564. The presentation of the ASCII text file in the systems's animated format is now complete.

User Interface

In FIGS. 1A-1D, 2A-2D, 3A-3D & 4A-4D, notice that added to the display of textual content are: a play/pause button 114; a display of the current reading speed 116; controls for adjusting reading speed 118; a display of the current page 120; and controls for moving from page to page 122 within the book, magazine or newspaper.

The reading speed display 116 can be touched/clicked and a dialogue box will pop up allowing the entry of a reading speed directly as well as offering a display speed mode choice of words or syllables.

The current page display 120 can be touched/clicked and a dialogue box will pop allowing the entry of a page number directly as well as offering the table of contents of the book, magazine or newspaper being read.

Touching/clicking a word on the computer display will move the highlighting of the word being read presently to the word touched/clicked on and pause play. Double tapping/clicking a word will activate a pop up dialogue box with definition, pictorial representation choices and vocal representation choices for the word. Additionally, the pop up dialogue box can be used to record audio of the word and add personal pictorial representations.

Touching/clicking the menu icon 124 activates a pop up dialogue box with an account to facilitate interacting with a host website. The account allows the user to access the host website to purchase books, magazines and newspapers rendered in the animated format with options for different supporting pictorial representations and vocal representations. The website will also contain a global word/picture/vocal database with multiple data sets for the approximately 180,000 words in human language which the user can select from. The account will store a subset of the global word/picture/vocal database on the user's device. Additionally, the users can share their personal pictorial representations and recorded vocal representations with the global word/picture/vocal database. The account can also be used to share user metrics to support software development.

Touching/clicking the settings icon 126 activates a pop up dialogue box containing a user profile. The user profile will store user selectable parameters for configuring the system. Tabs along the top of the dialogue box will offer different categories of parameters including body of text, highlighting, additional expression, pictorial representation, reading speed and vocal representation.

The body of text parameter are used to determine the basic word processing functionality for displaying a body of text on a computerized display and include font characteristics, background color and line spacing.

The highlighting parameters are used to determine the method of highlighting of the word being read presently in the body of the text and include font characteristics, use of a pointer, underlining, textual animation and enclosing in a shape.

The additional expression parameters are used to determine the manner in which additional expressions are displayed and include number, placement strategy and method of highlighting.

The placement strategies include: vertical line, which involves the system placing the selected number of additional expressions evenly spaced on an imaginary vertical line with a default placement of the imaginary vertical line in the center of the body of text which can be custom set; and custom, which initially displays the selected number of expressions evenly space on an imaginary vertical line but then allows the user to touch/click each additional expression and drag it to a preferred location.

The method of highlighting includes: change in font characteristics, use of spacing, underlining, use of textual animation and enclosing in a shape. The method of highlighting for additional expressions also has a tick box to duplicate the method of highlighting used to highlight the word or word group being read presently in the body of text. Use of textual animation includes: pointer animation, which creates a pointer directed at the highlighted word or word group; movement animation, which moves an element such as a shape, underline or font; font characteristic animation, which changes the font characteristics during display; size animation, which changes the size of a non-textual element such as a shape, underline or pointer; and border animation, which animates the border of a shape or underline.

The pictorial representation parameters are used to determine the manner in which pictorial representations are displayed and include: number, size, framing and behavior. Behavior includes: static, which displays pictorial representations in a section of the body of text the highlighting of the word or word group is not using; vertical swap, which moves a pictorial representation on the left, down, and a pictorial representation on the right, up, as the highlighting of the words or word groups progresses through a line of text; cumulative, which builds a series of pictorial representations left to right in a section of the body of text the highlighting of the word or word group is not using as the highlighting of the words or word groups progresses through a line of text; and tracking, which tracks the highlighting of a word or word in close proximity as the highlighting of the words or word groups progresses through a line of text.

The reading speed parameters are used to set default reading speed and display speed mode. The display speed mode is used to determine if the duration a highlighting of a word or word group is displayed should be based on words per minute or syllables per minute.

The vocal representation parameters are to used to determine the manner in which vocal representations are played/recorded and include: a play on/off button; computer generated, which offers a selection of computer generated voices to be used; and audio recording, which offers a selection of human voices to be used including user created voices.

In order to facilitate the creation of personal audio recordings, additional selections include: a record on/off button; timing preference, which offers a choice between default timing based on the set reading speed/display speed mode and custom timing which allows for the creation of a vocally enhanced textual content presentation with an irregular reading speed by the user touching/clicking each word to be recorded as the user reads the word out loud.

CONCLUSION

Although embodiments of reconditioning strategies implemented by a textual content speed player have been described in language specific to features and/or methods, it is to be understood that the subject of the appended claims is not necessarily limited to the specific features or methods described. Rather, the specific features and methods are disclosed as example implementations of textual content speed player.

A "computerized display" refers to a digital visual display device (e.g., LCD monitor/tv, plasma monitor/tv, CRT monitor/tv, laptop computer screen, tablet computer screen, eyeglass computer screen, digital projector and cell phone screen) connected to a computerized device (e.g., desktop computer, network computer, laptop computer, tablet computer, cell phone, mainframe computer, super computer, mini computer, micro computer, work station computer, PDA computer, enterprise server computer, smart watch computer, eyeglass computer, clothing computer and streaming device computer).

"Highlighting" refers to altering the aesthetic qualities of a selected section of a computerized display and/or a selected series of letters, numbers, spaces, symbols and/or punctuation contained in the selected section of the computer display in order to make the selected section of the computerized display and the selected series of letters, numbers, spaces, symbols and/or punctuation stand out from the unselected section of the computer display containing the unselected letters, numbers, spaces, symbols and/or punctuation.

An "additional expression" refers to a copy of a selected series of letter, numbers, spaces, symbols and/or punctuation from a body of text on a computerized display with or without the same aesthetic qualities as the selected series of letter, numbers, spaces, symbols and/or punctuation which is positioned in an additional location on the computerized display.

A "pictorial representation" refers to digitized visual media (e.g., photograph, movie, illustration, animation, drawing, painting, etching, sketch, mono print, woodcutting and lithograph) which is displayed on a computerized display in order to represent the meaning of a word or word group visually.

"Font characteristics" refers to aesthetic variations in a type face and the space immediately surrounding the type face including font (e.g., Arial, Times new roman, Courier and Helvetica Neue), font size, font type (e.g., bold, italic, underlined, outline, strikethrough, shadow, superscript and subscript), font style (e.g., condensed black, thin, light, medium and regular), font color, font background color, character spacing, baseline shift and capitalization (e.g., all caps, small caps and title case).

"textual animation" refers to continually altering the aesthetic qualities of a selected section of a computerized display and/or a selected series of letters, numbers, spaces, symbols, punctuation and/or graphic elements contained in the selected section of the computer display in order to create a sense of motion (e.g.: pointer animation, which creates a pointer directed at the highlighted word or word group; movement animation, which moves and element such as a shape, underline or font; font characteristic animation, which changes the font characteristics during display; size animation, which changes the size of a non-textual element such as a shape, underline or pointer; and border animation, which animates the border of a shape or underline.)

"Vocal representation" refers to an audible representation of a word or word group being read presently using a computer generated voice or a recording of a human voice to speak the word or word group.

What is claimed:
1. A computer implemented method of presenting textual content, comprising:
  (a) a pagination process that displays a body of text on a computerized display by compiling a selection of consecutive textual content from a file containing textual content so that the selection begins with undisplayed textual content found closest to a start of the file and ends with textual content that either fills the computerized display, precedes a page break or is last in the file,
  wherein after the selection displayed in the body of text has been subjected to a highlight process the body of text is removed from the computerized display and the pagination process repeats;
  (b) the highlight process that applies a text highlight to a current word element in the body of text for a duration of time,
  wherein the current word element is selected from a group comprising a word and a word group,
  wherein the word is a word found closest to a start of the body of text that has not had the text highlight applied to it,
  wherein the word group is a consecutive series of words lead-off by the word with a number of words following the word,
  wherein the current word element is determined by searching a database containing known word elements,
  wherein the text highlight is a variation in aesthetic qualities of the current word element intended to make the current word element stand out from all other textual content in the body of text,
  wherein the duration of time is a product of a length of time a text element is highlighted determined via user settings and a quantity of the text element assigned to the current word element,
  wherein the text element is selected from a group comprising a syllable and a word,
  wherein when the duration of time has expired the text highlight is removed from the current word element and the highlight process repeats unless the current word element contains a word that is last in the file which stops the computer implemented method of presenting textual content,
  wherein every instance that the duration of time expires on the current word element constitutes a current word cycle;
  (c) displaying an additional expression in an additional position on the computerized display while the text highlight is applied to the current word element,
  wherein the additional expression is a series of character elements which comprise the current word element,
  wherein said character elements are selected from a group comprising letters, numbers, spaces, symbols and punctuation,
  wherein the additional position is a centralized location on the computerized display within the body of text that is different from a location of the current word element; and

(d) displaying a current pictorial representation in one or more current pictorial positions on the computerized display while the text highlight is applied to the current word element, wherein the current pictorial representation is pictorial digital media selected from a group comprising a still image and a moving image, wherein the current pictorial representation is associated with the current word element in the database.

2. The method of claim 1, wherein the text highlight is created by adjusting one or more font characteristics of the current word element, wherein said font characteristics are selected from a group comprising font, font size, font type, font style, font color, font background color, character spacing, baseline shift and capitalization.

3. The method of claim 1, wherein the text highlight is created by applying one or more aesthetic manipulations to the current word element selected from a group comprising: enclosing the current word element in a shape; underlining the current word element; applying a textual animation to the current word element;

and applying a line pointing at the current word element, wherein the textual animation is created by continually adjusting a variation in aesthetic qualities of the current word element to create a sense of motion.

4. The method of claim 1, further comprising the step of applying an additional highlight to the additional expression, wherein the additional highlight is a variation in aesthetic qualities of the additional expression intended to make the additional expression stand out from the body of text.

5. The method of claim 4, wherein the additional highlight is created by adjusting one or more font characteristics of the additional expression, wherein said font characteristics are selected from a group comprising font, font size, font type, font style, font color, font background color, character spacing, baseline shift and capitalization.

6. The method of claim 4, wherein the additional highlight is created by applying one or more aesthetic manipulations to the additional expression selected from a group comprising: enclosing the additional expression in a shape; underlining the additional expression; applying a textual animation to the additional expression; and applying a line pointing at the additional expression, wherein the textual animation is created by continually adjusting a variation in aesthetic qualities of the additional expression to create a sense of motion.

7. The method of claim 1, wherein the additional expression is displayed in multiple or a singular said additional position.

8. The method of claim 1, wherein the body of text is apportioned into one or more sections with each section containing one said additional position where the additional expression is displayed.

9. The method of claim 1, wherein said current pictorial positions for successive said current word cycles are different positions on the computerized display which constitutes a pictorial positioning differential.

10. The method of claim 9, wherein with every said current word cycle the text highlight proceeds through the body of text which creates a highlight repositioning progression while simultaneously with every said current word cycle the pictorial positioning differential creates a pictorial repositioning progression.

11. The method of claim 10, wherein as the highlight repositioning progression proceeds from a beginning to an end of a line of text with each said current word cycle, the pictorial repositioning progression relocates with each said current word cycle the first of two said current pictorial positions from the body of text's bottom left side toward the body of text's top left side while the pictorial repositioning progression simultaneously relocates with each said current word cycle the second of two said current pictorial positions from the body of text's top right side toward the body of text's bottom right side.

12. The method of claim 10, wherein as the highlight repositioning progression proceeds from a beginning to an end of a line of text, the pictorial repositioning progression relocates one said current pictorial position from the body of text's left side toward the body of text's right side with all pictorial representations remaining displayed in a row by the transition process until the duration of time has elapsed on the current word cycle that is last in the line of text.

13. The method of claim 10, wherein as the highlight repositioning progression proceeds from a beginning to an end of a line of text, the pictorial repositioning progression relocates one said current pictorial position to track the text highlight, wherein track refers to maintaining proximity with the text highlight.

14. The method of claim 1, wherein the quantity of the text element is a sum of: a number of the text element in the current word element; a number of spaces in the current word element multiplied by an assigned coefficient; and each piece of punctuation or symbol multiplied by a corresponding assigned coefficient.

15. The method of claim 1, further comprising the step of playing a vocal representation in conjunction with the text highlight, wherein the vocal representation is an audible representation of the current word element produced by means selected from a group comprising a computer generated voice and a recording of a human voice.

16. The method of claim 1, further comprising the step of creating an audio recording of the current word element being spoken in conjunction with the text highlight.

17. The method of claim 16, wherein the audio recording is associated with the current word element in a database.

18. A computer implemented method of presenting textual content, comprising:

(a) a pagination process that displays a body of text on a computerized display by compiling a selection of consecutive textual content from a file containing textual content so that the selection begins with undisplayed textual content found closest to a start of the file and ends with textual content that either fills the computerized display, precedes a page break or is last in the file, wherein after the selection displayed in the body of text has been subjected to a highlight process the body of text is removed from the computerized display and the pagination process repeats;

(b) the highlight process that applies a text highlight to a current word element in the body of text for a duration of time, wherein the current word element is selected from a group comprising a word and a word group, wherein the word is a word found closest to a start of the body of text that has not had the text highlight applied to it, wherein the word group is a consecutive series of words lead-off by the word with a number of words following the word, wherein the current word element is determined by searching a database containing known word elements, wherein the text highlight is a variation in aesthetic qualities of the current word element intended to make the current word element stand out from all other textual content in the body of text, wherein the duration of time is a product of a length of time a text element is highlighted determined via user settings and a quantity of the text element assigned to the current word element, wherein the text element is selected from a group comprising a syllable and a word, wherein when the duration of time has expired the text highlight is removed from the current word element and the highlight process repeats unless the current word element contains a word that is last in the file which stops the computer implemented method of presenting textual content, wherein every instance that the duration of time expires on the current word element constitutes a current word cycle; and (c) displaying an additional expression in an additional position on the computerized display while the text highlight is applied to the current word element, wherein the additional expression is a series of character elements which comprise the current word element, wherein said character elements are selected from a group comprising letters, numbers, spaces, symbols and punctuation, wherein the additional position is a centralized location on the computerized display within the body of text that is different from a location of the current word element.

19. The method of claim 18, wherein the text highlight is created by adjusting one or more font characteristics of the current word element, wherein said font characteristics are selected from a group comprising font, font size, font type, font style, font color, font background color, character spacing, baseline shift and capitalization.

20. The method of claim 18, wherein the text highlight is created by applying one or more aesthetic manipulations to the current word element selected from a group comprising: enclosing the current word element in a shape; underlining the current word element; applying a textual animation to the current word element; and applying a line pointing at the current word element, wherein the textual animation is created by continually adjusting a variation in aesthetic qualities of the current word element to create a sense of motion.

21. The method of claim 18, further comprising the step of applying an additional highlight to the additional expression for the duration of time in conjunction with the text highlight, wherein the additional highlight is a variation in aesthetic qualities of the additional expression intended to make the additional expression stand out from the body of text.

22. The method of claim 21, wherein the additional highlight is created by adjusting one or more font characteristics of the additional expression, wherein said font characteristics are selected from a group comprising font, font size, font type, font style, font color, font background color, character spacing, baseline shift and capitalization.

23. The method of claim 21, wherein the additional highlight is created by applying one or more aesthetic manipulations to the additional expression selected from a group comprising: enclosing the additional expression in a shape; underlining the additional expression; applying a textual animation to the additional expression; and applying a line pointing at the additional expression, wherein the textual animation is created by continually adjusting a variation in aesthetic qualities of the additional expression to create a sense of motion.

24. The method of claim 18, wherein the additional expression is displayed in multiple or a singular said additional position.

25. The method of claim 18, wherein the body of text is apportioned into one or more sections with each section containing one said additional position.

26. The method of claim 18, wherein the quantity of the text element is a sum of: a number of the text element contained in the current word element; a number of spaces in the current word element multiplied by an assigned coefficient; and each piece of punctuation and symbol multiplied by a corresponding assigned coefficient.

27. The method of claim 18, further comprising the step of playing a vocal representation in conjunction with the text highlight, wherein the vocal representation is an audible representation of the current word element produced by means selected from a group comprising a computer generated voice and a recording of a human voice.

28. The method of claim 18, further comprising the step of creating an audio recording of the current word element being spoken in conjunction with the text highlight.

29. The method of claim 28, wherein the audio recording is associated with the current word element in a database.

30. A computer implemented method of presenting textual content, comprising:

(a) a pagination process that displays a body of text on a computerized display by compiling a selection of consecutive textual content from a file containing textual content so that the selection begins with undisplayed textual content found closest to a start of the file and ends with textual content that either fills the computerized display, precedes a page break or is last in the file, wherein after the selection displayed in the body of text has been subjected to a highlight process the body of text is removed from the computerized display and the pagination process repeats;

(b) the highlight process that applies a text highlight to a current word element in the body of text for a duration of time, wherein the current word element is selected from a group comprising a word and a word group, wherein the word is a word found closest to a start of the body of text that has not had the text highlight applied to it, wherein the word group is a consecutive series of words lead-off by the word with a number of words following the word, wherein the current word element is determined by searching a database containing known word elements, wherein the text highlight is a variation in aesthetic qualities of the current word element intended to make the current word element stand out from all other textual content in the body of text, wherein the duration of time is a product of a length of time a text element is highlighted determined via user settings and a quantity of the text element assigned to the current word element, wherein the text element is selected from a group comprising a syllable and a word, wherein when the duration of time has expired the text highlight is removed from the current word element and the highlight process repeats unless the current word element contains a word that is last in the file which stops the computer implemented method of presenting textual content, wherein every instance that the duration of time expires on the current word element constitutes a current word cycle; and (c) displaying a current pictorial representation in one or more current pictorial positions on the computerized display while the text highlight is applied to the current word element, wherein the current pictorial representation is pictorial digital media selected from a group comprising a still image and a moving image, wherein the current pictorial representation is associated with the current word element in the database.

* * * * *